United States Patent
Bae et al.

(10) Patent No.: US 9,203,681 B2
(45) Date of Patent: Dec. 1, 2015

(54) METHOD AND APPARATUS FOR PERFORMING SOFT DEMAPPING IN ROTATED QUADRATURE AMPLITUDE MODULATION (QAM) BASED COMMUNICATION SYSTEM

(71) Applicant: Samsung Electronics Co., Ltd., Suwon-si (KR)

(72) Inventors: Ki Taek Bae, Hwaseong-si (KR); Peng Xue, Hwaseong-si (KR); Kyeong Yeon Kim, Hwaseong-si (KR); Navneet Basutkar, Yongin-si (KR); Ho Yang, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/518,356

(22) Filed: Oct. 20, 2014

(65) Prior Publication Data

US 2015/0146810 A1 May 28, 2015

(30) Foreign Application Priority Data

Nov. 28, 2013 (KR) .................. 10-2013-0146518

(51) Int. Cl.
*H04L 27/38* (2006.01)

(52) U.S. Cl.
CPC .................. *H04L 27/38* (2013.01)

(58) Field of Classification Search
CPC ..... H04L 27/06; H04L 27/38; H04L 27/2649; H04L 27/3444; H04L 25/067; H03M 13/655
USPC ................... 375/261, 262, 320, 341
See application file for complete search history.

(56) References Cited

U.S. PATENT DOCUMENTS

| | | | |
|---|---|---|---|
| 2005/0201484 A1* | 9/2005 | Wilhelmsson et al. | 375/286 |
| 2012/0250805 A1 | 10/2012 | Shin | |
| 2014/0270012 A1* | 9/2014 | Sagi | 375/341 |

* cited by examiner

*Primary Examiner* — Leon Flores
(74) *Attorney, Agent, or Firm* — NSIP Law

(57) ABSTRACT

A method of performing a soft demapping, includes obtaining a signal from a symbol representing bits that is transmitted from a transmitter, and calculating a gradient of a reference line in a constellation for a bit based on a rotation angle and a channel state of the constellation. The method further includes selecting a candidate for each of lines that corresponds to a logic value of the bit from constellation points included in the constellation based on the signal and the gradient of the reference line, and calculating a log-likelihood ratio (LLR) of the bit based on the signal and the selected candidate for each of the lines.

17 Claims, 19 Drawing Sheets

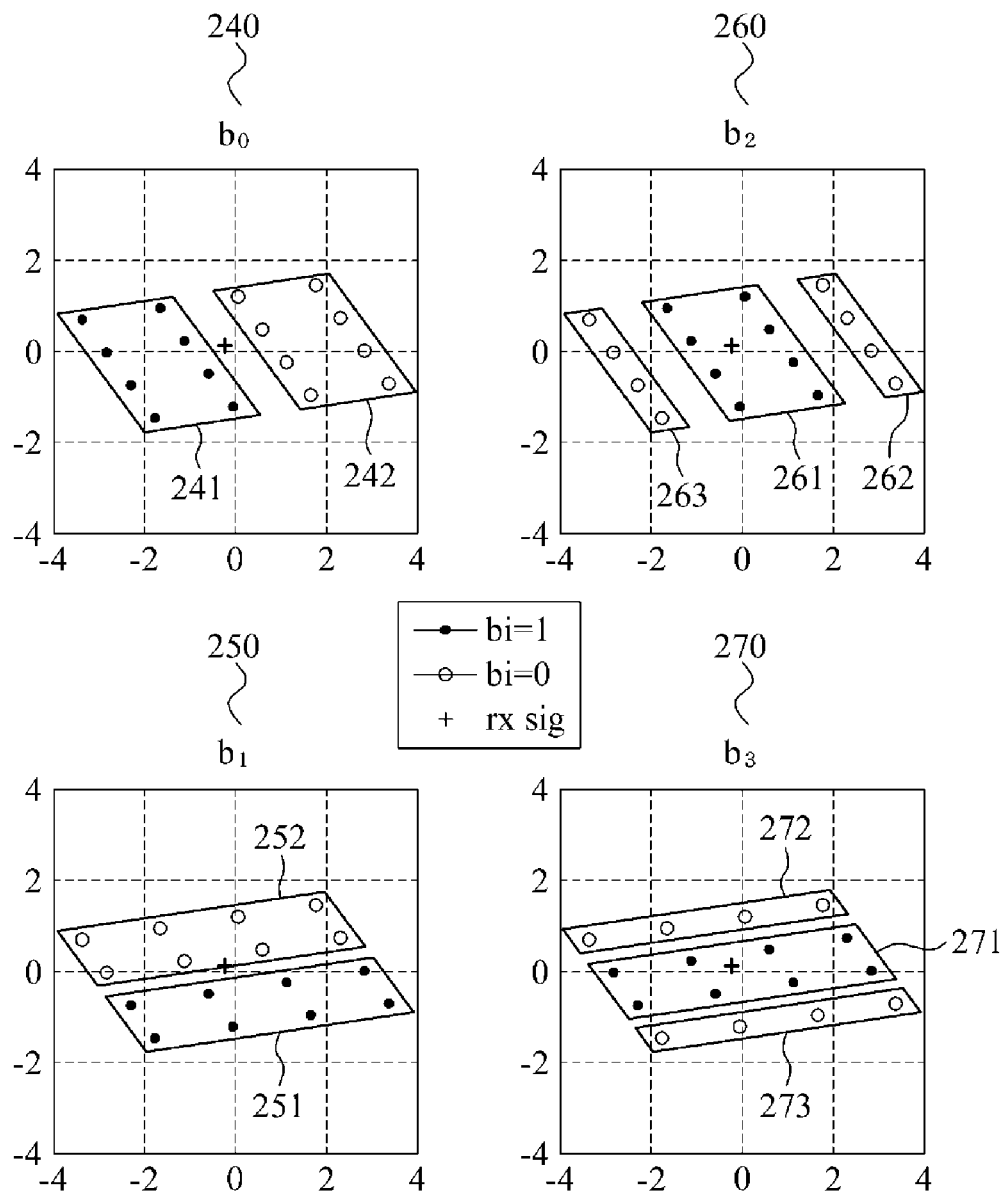

FIG. 4A
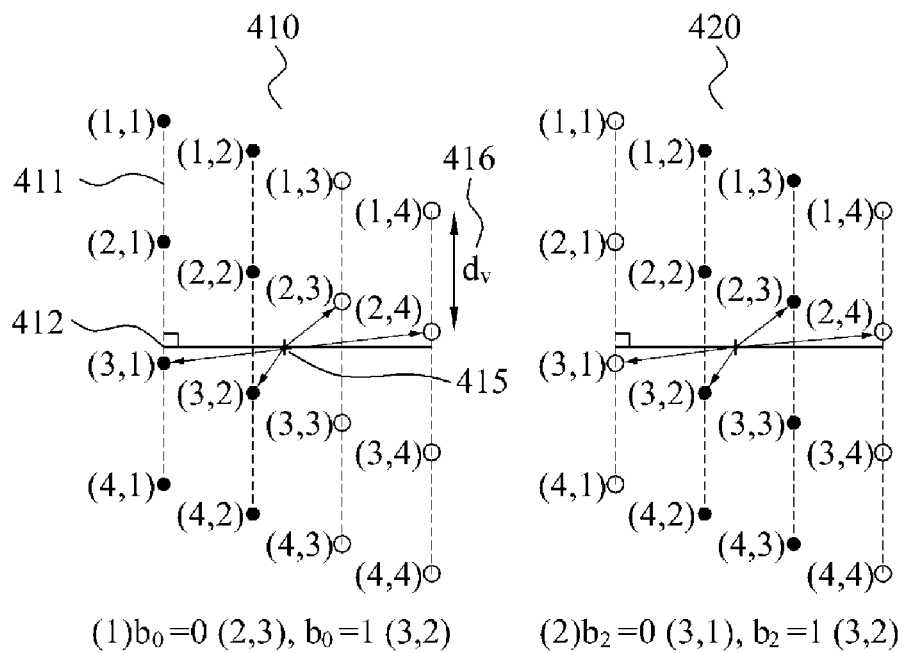
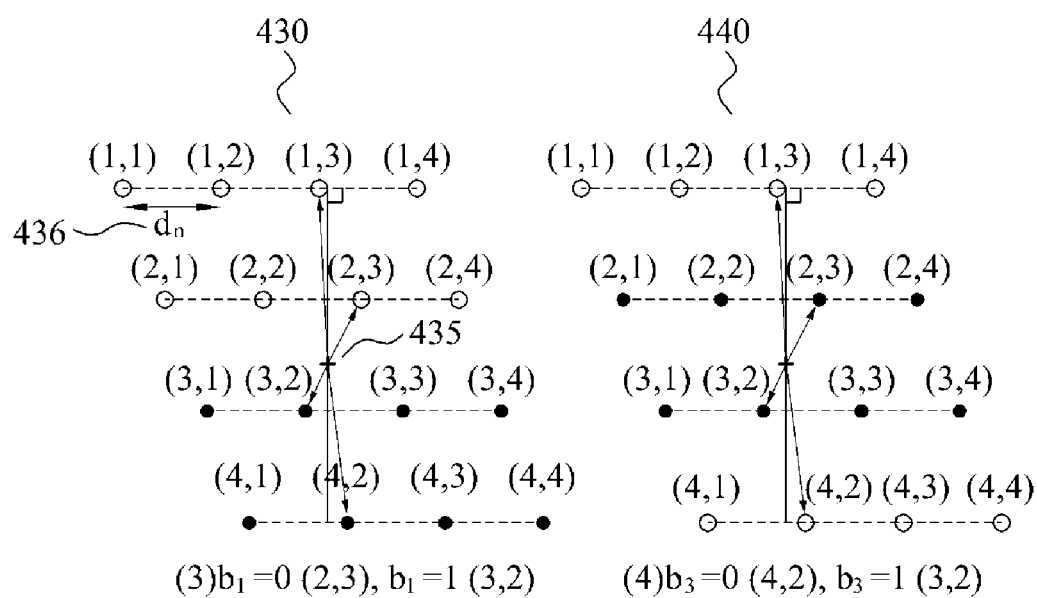

(1) Odd-numbered bits        (2) Even-numbered bits

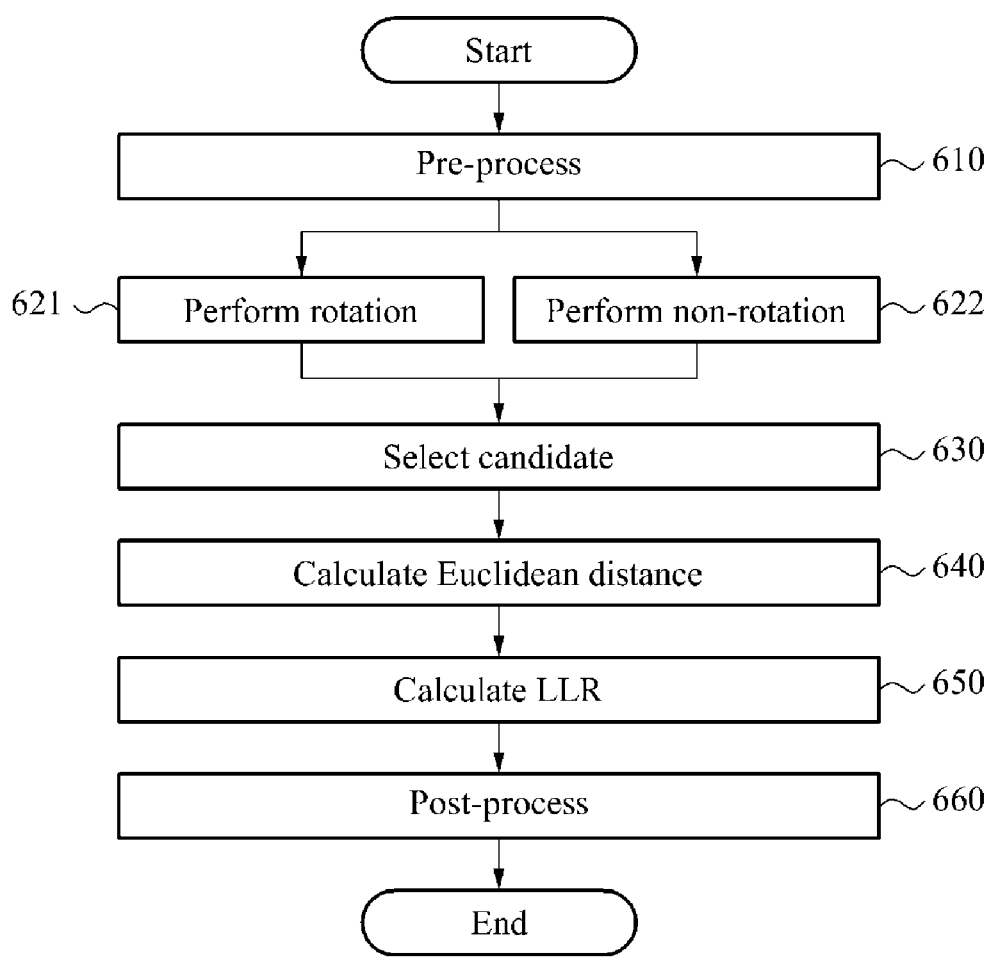

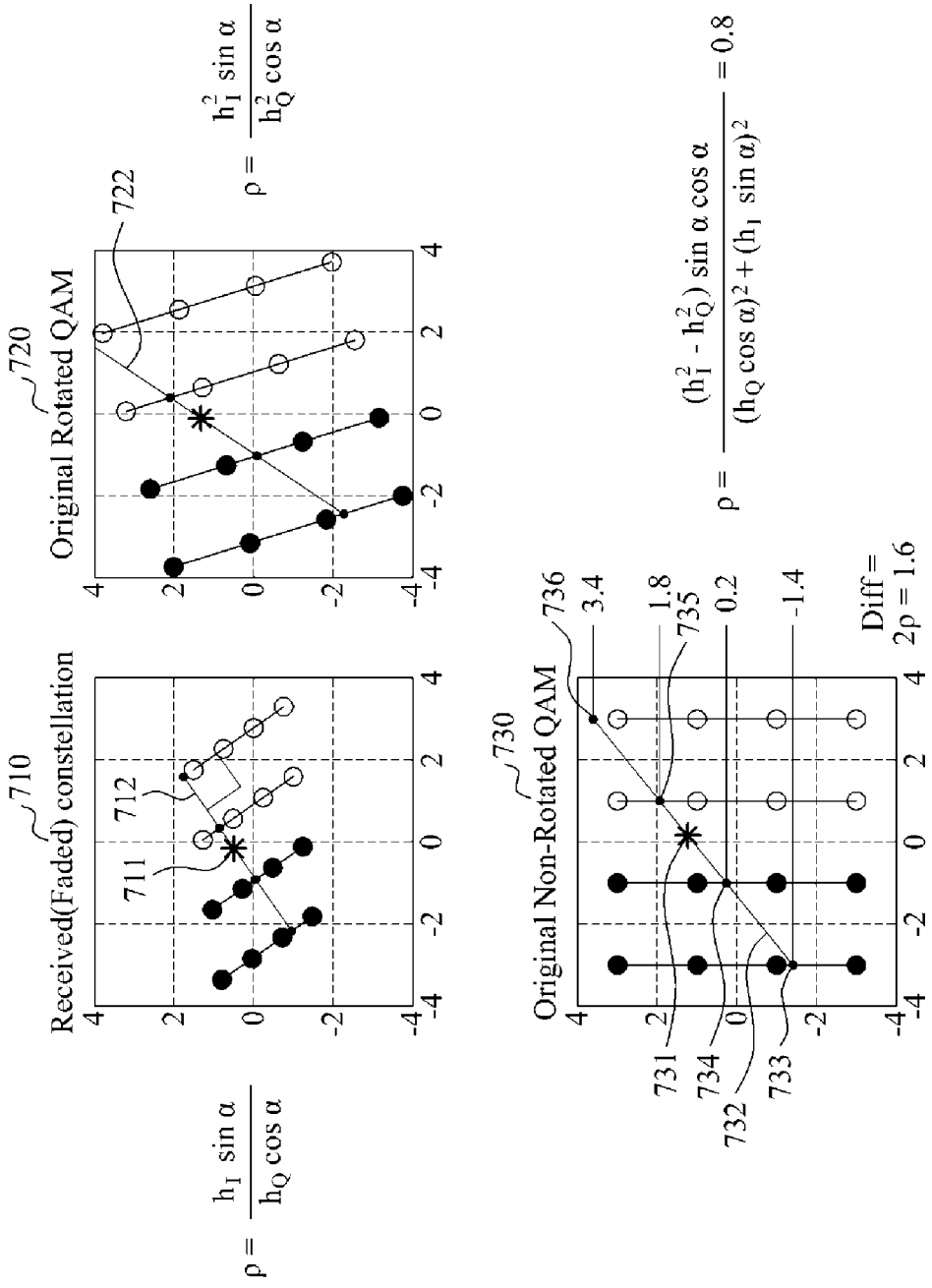

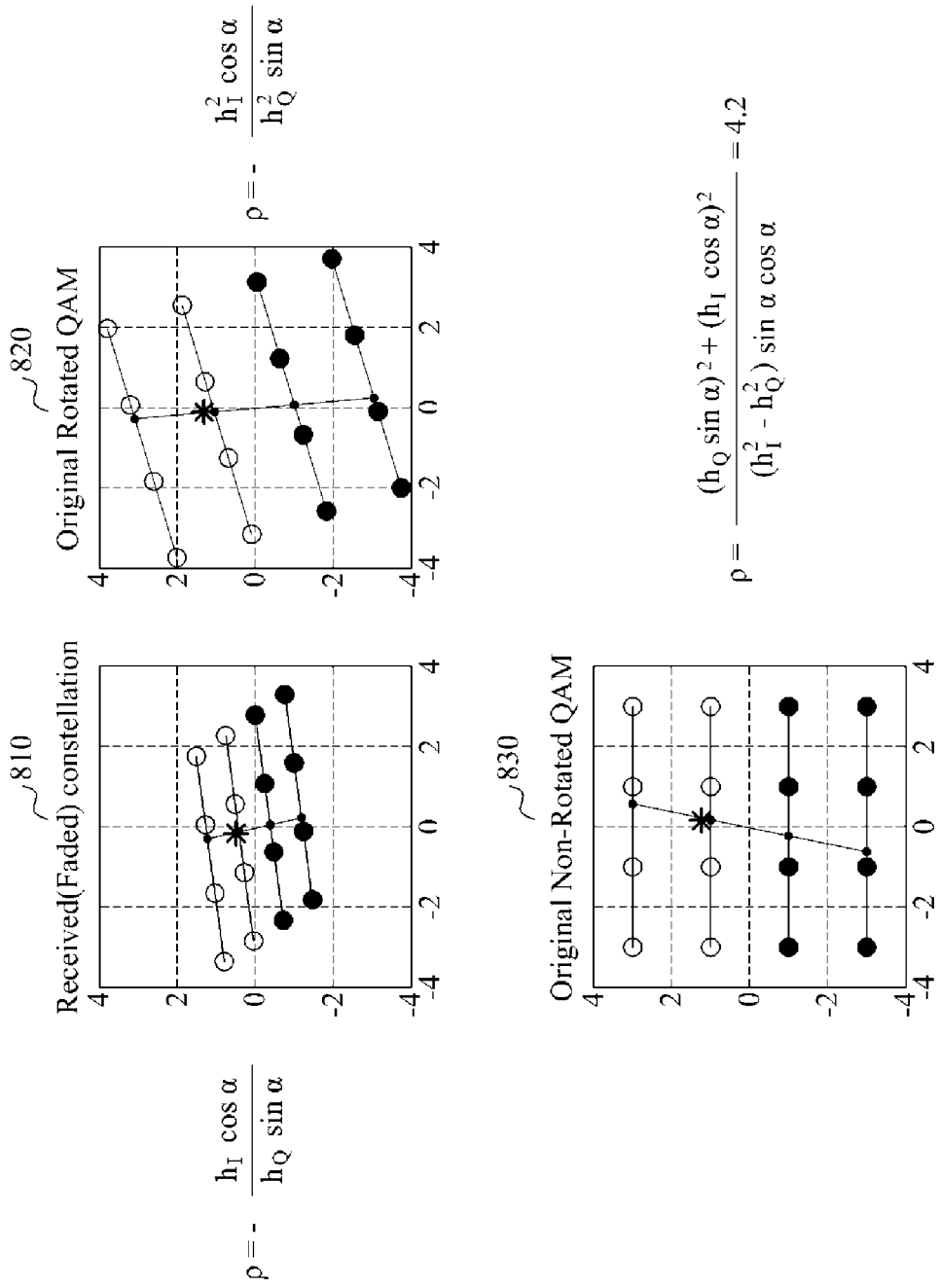

METHOD AND APPARATUS FOR PERFORMING SOFT DEMAPPING IN ROTATED QUADRATURE AMPLITUDE MODULATION (QAM) BASED COMMUNICATION SYSTEM

CROSS-REFERENCE TO RELATED APPLICATION

This application claims the benefit under 35 USC 119(a) of Korean Patent Application No. 10-2013-0146518, filed on Nov. 28, 2013, in the Korean Intellectual Property Office, the entire disclosure of which is incorporated herein by reference for all purposes.

BACKGROUND

1. Field

The following description relates to a method and an apparatus for performing a soft demapping in a rotated quadrature amplitude modulation (QAM) based communication system.

2. Description of Related Art

A wireless communication system and a broadcasting system may use a rotated quadrature amplitude modulation (QAM) transmission technology. For example, a digital video broadcasting (DVB) standard, for example, a digital video broadcasting-second generation terrestrial (DVB-T2) standard, prescribes that data be transmitted based on the rotated QAM.

Fading may occur in a wireless channel of a wireless communication system. Here, the fading refers to attenuation of a wireless signal during transmission of the wireless signal. To combat such fading-related issues, a diversity method may be employed. For example, the diversity method includes spatial diversity and frequency diversity. More particularly, a signal-space diversity method is being adopted by a great number of technologies, including the DVB-T2 standard. As an example, a rotated QAM constellation may be used to implement the signal-space diversity method. However, when a transmitter uses the rotated QAM, a great complexity may be required for a receiver to perform a soft demapping.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of performing a soft demapping, the method including obtaining a signal from a symbol representing bits that is transmitted from a transmitter, and calculating a gradient of a reference line in a constellation for a bit based on a rotation angle and a channel state of the constellation. The method further includes selecting a candidate for each of lines that corresponds to a logic value of the bit from constellation points included in the constellation based on the signal and the gradient of the reference line, and calculating a log-likelihood ratio (LLR) of the bit based on the signal and the selected candidate for each of the lines.

The calculating of the gradient of the reference line may include calculating a gradient of a straight line located at right angles to the lines in the constellation to which the rotation angle and the channel state are applied, scaling the gradient of the straight line based on the channel state, and rotating the scaled gradient of the straight line based on the rotation angle.

The selecting of the candidate for each of the lines may include projecting the signal to the lines based on the gradient of the reference line, and selecting a constellation point closest to a point at which the signal is projected to a corresponding line from constellation points included in the corresponding line, for each of the lines.

The calculating of the LLR may include calculating Euclidean distances between the signal and the selected candidate for each of the lines, and calculating the LLR based on the Euclidean distances.

The method may further include storing, in a lookup table (LUT), the Euclidean distances and indices of the selected candidate for each of the lines, and calculating an LLR of another bit based on the stored Euclidean distances and the stored indices.

The method may further include calculating an LLR of another bit of which an index is an even number among the bits based on the signal and the selected candidate for each of the lines in response to an index of the bit among the bits being an even number, and calculating an LLR of still another bit of which an index is an odd number among the bits based on the signal and the selected candidate for each of the lines in response to the index of the bit among the bits being an odd number.

The method may further include detecting the bits based on the LLR of the bit.

The symbol may be an M-quadrature amplitude modulation (QAM) symbol, M being $2^n$, and n being an integer greater than two, and each of the lines may include a $\sqrt{M}$ number of constellation points.

A non-transitory computer-readable storage medium may store a program including instructions to cause a computer to perform the method.

In another general aspect, there is provided an apparatus configured to perform a soft demapping, the apparatus including a pre-processing unit configured to pre-process a signal obtained from a symbol representing bits that is transmitted from a transmitter, and a gradient calculation unit configured to calculate a gradient of a reference line in a constellation for a bit based on a rotation angle and a channel state of the constellation. The apparatus further includes a candidate selection unit configured to select a candidate for each of lines that corresponds to a logic value of the bit from constellation points included in the constellation based on the signal and the gradient of the reference line, and a log-likelihood ratio (LLR) calculation unit configured to calculate an LLR of the bit based on the signal and the selected candidate for each of the lines.

The gradient calculation unit may be configured to calculate the gradient of the reference line to be $$\frac{(h_I^2 - h_Q^2)\sin\alpha\cos\alpha}{(h_Q\cos\alpha)^2 + (h_I\sin\alpha)^2},$$

$h_I$ being a state of a first channel included in the channel state, $h_Q$ being a state of a second channel included in the channel state, and $\alpha$ being the rotation angle, in response to the bit belonging to a first group among the bits, and calculate the gradient of the reference line to be $$\frac{(h_Q \sin\alpha)^2 + (h_I \cos\alpha)^2}{(h_I^2 - h_Q^2)\sin\alpha\cos\alpha},$$

in response to the bit belonging to a second group among the bits.

The candidate selection unit may include a coordinates calculation unit configured to calculate coordinates of intersecting points between a straight line crossing the signal and the lines based on the gradient of the reference line, and a constellation point selection unit configured to select a constellation point closest to an intersecting point between the straight line and a corresponding line from constellation points included in the corresponding line, for each of the lines.

The apparatus may further include a final LLR calculation unit configured to calculate a final LLR to be used to detect the bits, based on the LLR of the bit.

The apparatus may further include a lookup table (LUT) configured to store Euclidean distances between the signal and the selected candidate for each of the lines and indices of the selected candidate for each of the lines. The LLR calculation unit may be configured to calculate an LLR of another bit based on the stored Euclidean distances and the stored indices.

Other features and aspects will be apparent from the following detailed description, the drawings, and the claims.

BRIEF DESCRIPTION OF THE DRAWINGS

FIG. 2B is a diagram illustrating an example of constellations for a plurality of bits.

FIG. 4A is a diagram illustrating an example of selecting a candidate for LLR calculation in a vertical 16 QAM constellation and a horizontal 16 QAM constellation.

FIG. 6 is a flowchart illustrating an example of a soft demapping method.

FIGS. 7A through 7D are diagrams illustrating examples of a method of selecting a best candidate for a plurality of lines.

FIGS. 8A and 8B are diagrams illustrating examples of a method of calculating a gradient of a reference line in a constellation for even-numbered bits from among a plurality of bits included in a symbol.

Figure 1A:
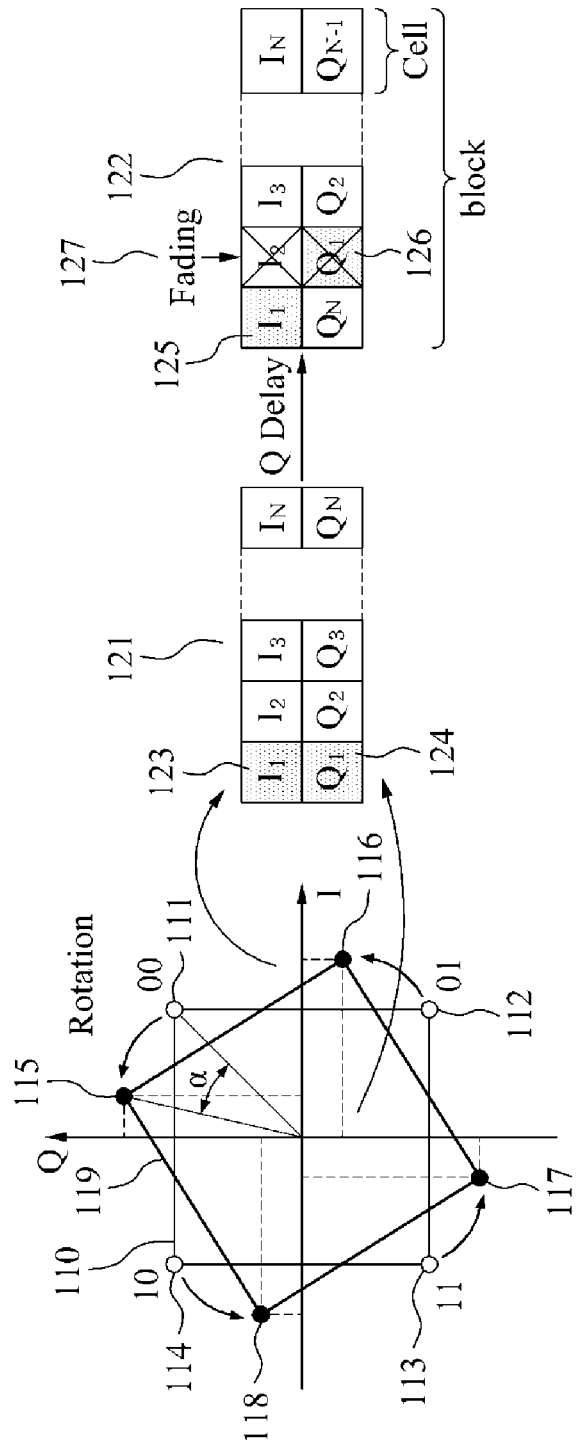
FIG. 1A is a diagram illustrating an example of rotated quadrature amplitude modulation (QAM) to which a Q delay is applied.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1A illustrates an example of rotated quadrature amplitude modulation (QAM) to which a Q delay is applied. In general, a 4-QAM uses constellation points 111, 112, 113, and 114 disposed in a square-shaped constellation 110 having identical Q channel intervals and identical I channel intervals. Each of the constellation points 111, 112, 113, and 114 corresponds to a plurality of bits. For example, the constellation point 111 corresponds to "00", the constellation point 112 corresponds to "01", the constellation point 113 corresponds to "11", and the constellation point 114 corresponds to "10".

When an "n" number of bits $\{b_0, b_1, b_2, \ldots, b_{n-1}\}$, "n" being an integer greater than two, is assumed to be mapped to an M-QAM symbol (M=$2^n$), the M-QAM symbol is represented by $s = s_I + js_Q$, where "s" denotes an M-QAM symbol, "$s_I$" denotes a signal of an I channel, "$s_Q$" denotes a signal of a Q channel, and "j" denotes an operator representing an imaginary number portion. In the following descriptions, unless otherwise indicated, a "QAM symbol" includes, for example, a QAM symbol, a 16-QAM symbol, a 32-QAM symbol, a 64-QAM symbol, or any of various types of general M-QAM symbols.

A rotated 4-QAM uses a rotated constellation 119 obtained through the constellation 110 being rotated by a predetermined angle "α". The rotated constellation 119 includes constellation points 115, 116, 117, and 118 rotated by the predetermined angle "α". Each of the rotated constellation points 115, 116, 117, and 118 corresponds to a plurality of bits. For example, the constellation point 115 corresponds to "00", the constellation point 116 corresponds to "01", the constellation point 117 corresponds to "11", and the constellation point 118 corresponds to "10. When a rotated QAM symbol is generated using a rotation angle α, the rotated QAM symbol is defined by Equation 1.

$$\tilde{s} = e^{j\alpha}s \quad \text{[Equation 1]}$$
$$= \tilde{s}_I + j\tilde{s}_Q$$
$$= (s_I\cos\alpha - s_Q\sin\alpha) + j(s_I\sin\alpha + s_Q\cos\alpha)$$

In Equation 1, $\tilde{s}$ denotes a rotated QAM symbol, $e^{j\alpha}$ denotes a rotation operator, $\tilde{s}_I$ denotes a rotated signal obtained through an I channel signal being rotated by a rotation angle α, and $\tilde{s}_Q$ denotes a rotated signal obtained through a Q channel signal being rotated by the rotation angle α.

A receiver obtains a received signal from the rotated QAM symbol transmitted by a transmitter. The receiver performs an orthogonal frequency-division multiplexing (OFDM) demodulation to detect a plurality of bits from the received signal. For example, the receiver collects a real number portion from a sub-carrier corresponding to an I channel, and collects an imaginary number portion from a sub-carrier corresponding to a Q channel. The received signal is expressed by Equation 2 using the real number portion and the imaginary number portion collected from the two corresponding sub-carriers.

$$r = r_I + jr_Q = h_I\tilde{s}_I + jh_Q\tilde{s}_Q + w \quad \text{[Equation 2]}$$

In Equation 2, "r" denotes a received signal, "$r_I$" denotes a received signal of an I channel, "$r_Q$" denotes a received signal of a Q channel, $h_I$ denotes channel information of a sub-carrier corresponding to an I channel, $h_Q$ denotes channel information of a sub-carrier corresponding to a Q channel, and "w" denotes noise. Each channel information may refer to an amplitude of a channel.

In general, an I channel signal of a real number portion and a Q channel signal of an imaginary number portion included in a QAM symbol are transmitted via an identical carrier, having a phase difference of 90 degrees. For example, I and Q components of a rotated QAM symbol are indicated as a block 121. Each column included in the block 121 indicates a single carrier. When a Q delay is not applied, a real number portion "E" 123 and an imaginary number portion "$Q_1$" 124 of a rotated QAM symbol "$s_1$" are mapped to an identical sub-carrier in OFDM.

A Q delay is introduced to a rotated QAM to obtain an additional diversity. The Q delay may refer to a method of mapping an I channel signal of a real number portion and a Q channel signal of an imaginary number portion that are included in an identical QAM symbol to differing carriers. When the Q delay is introduced to the rotated QAM, a component-axes interleaving may be performed. When the Q delay is introduced to the rotated QAM symbol, the real number portion and the imaginary number portion of the rotated QAM symbol may be mapped and transmitted to a plurality of differing sub-carriers in OFDM. For example, I and Q components of the rotated QAM symbol to which the Q delay is introduced are indicated as a block 122. When the Q delay is introduced, a real number portion "$I_1$" 125 and an imaginary number portion "$Q_1$" 126 of the rotated QAM symbol "$s_1$" are mapped to the plurality of differing sub-carriers in OFDM, respectively. A cyclic Q delay may be introduced in a forward error correction (FEC) block unit. Referring to the block 122, a final Q channel signal "$Q_N$" and a first I channel signal "$I_1$" in the block are mapped to an identical carrier through the cyclic Q delay.

When the interleaving is performed by introducing the Q delay, the receiver restores a signal of a fading cell from a signal of a different cell when a signal of a predetermined cell is not received due to fading. As used herein, a single cell corresponds to a single OFDM sub-carrier. When the interleaving is performed by introducing the Q delay, a probability of the receiver not receiving both of "$I_1$" 125 and "$Q_1$" 126 is significantly low because a probability of fading occurring in both of a cell to which "$I_1$" 125 is mapped and a cell to which "$Q_1$" 126 is mapped is relatively lower than a probability of fading occurring in one of the cell to which "$I_1$" 125 is mapped and the cell to which "$Q_1$" 126 is mapped. Accordingly, when one of a real number portion signal and an imaginary number portion signal of a predetermined rotated QAM symbol is not received due to fading, the receiver restores an un-received signal using the other of the two signals. For example, when "$Q_1$" 126 is not received due to fading 127, the receiver restores "$Q_1$" 126 using "$I_1$" 125.

Figure 1B:
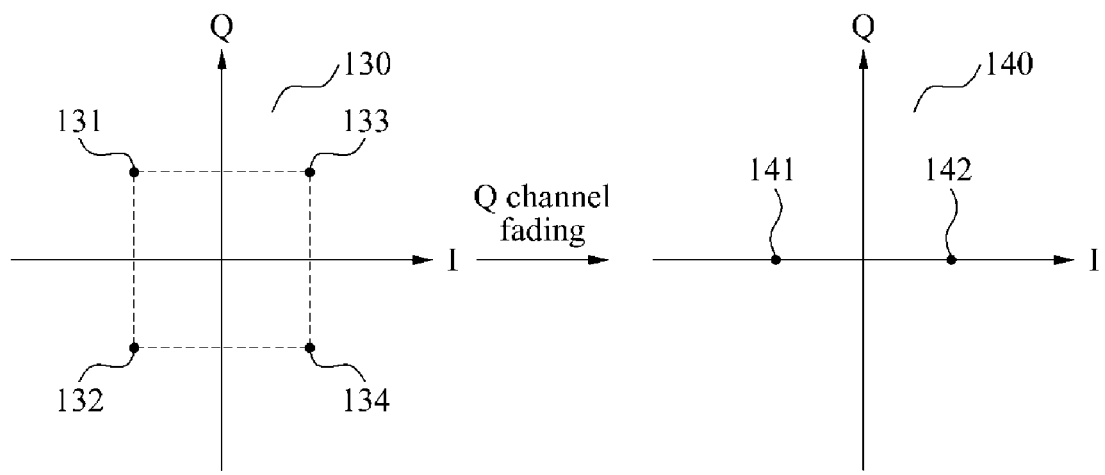
FIGS. 1B and 1C are diagrams illustrating examples of when a diversity gain is generated when a rotated QAM symbol having a Q delay is used, compared to when a general QAM symbol is used.
Figure 1C:
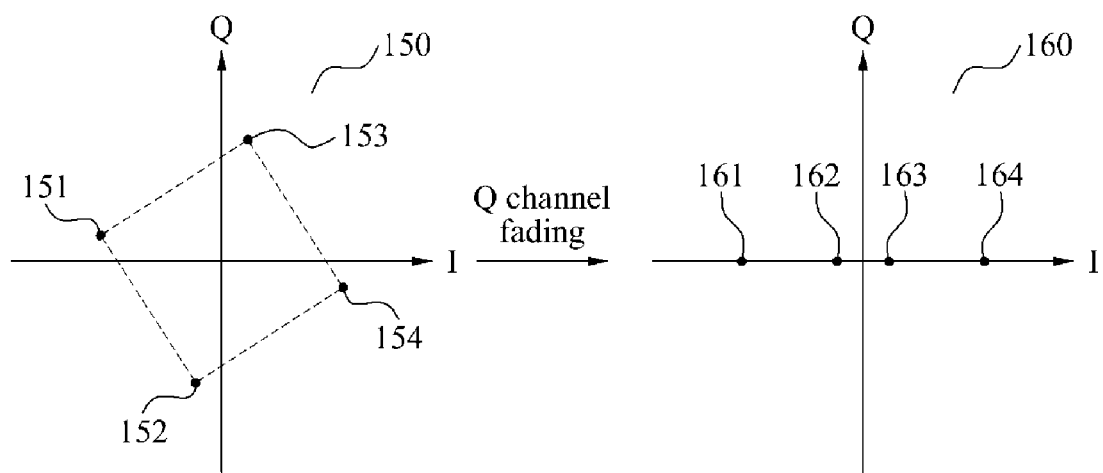

FIGS. 1B and 1C illustrate examples of when a diversity gain is generated when a rotated QAM symbol having a Q delay is used, compared to when a general QAM symbol is used. Referring to FIG. 1B, a transmitter transmits a symbol corresponding to one of constellation points 131, 132, 133, and 134 included in a constellation 130 when a general QAM symbol is used. For example, the transmitter transmits a symbol corresponding to the constellation point 131 to transmit two bits, for example, "10". Alternatively, the transmitter transmits a symbol corresponding to the constellation point 132 to transmit two bits, for example, "11". When fading occurs in a Q channel, a receiver faces difficulty in determining whether a symbol transmitted by the transmitter is the symbol corresponding to the constellation point 131 or the symbol corresponding to the constellation point 132 because the symbol corresponding to the constellation point 131 and the symbol corresponding to the constellation point 132 are distinguished by the Q channel. In this example, the receiver may receive a symbol corresponding to one of constellation points 141 and 142 included in a constellation 140, and face difficulty in determining whether the symbol corresponding to one of the constellation points 141 and 142 is the symbol corresponding to one of the constellation points 131, 132, 133, and 134.

Referring to FIG. 1C, the transmitter transmits a symbol corresponding to one of constellation points 151, 152, 153, and 154 included in a constellation 150 when a rotated QAM symbol is used. As an alternative to when the general QAM symbol is used, the receiver restores a symbol transmitted by the transmitter, using the rotated QAM symbol, despite an occurrence of fading in the Q channel. For example, when a symbol corresponding to the constellation point 151 is transmitted, the receiver receives a received signal corresponding to a constellation point 161 included in a constellation 160 despite an occurrence of fading in the Q channel. The receiver determines a symbol transmitted by the transmitter to be the symbol corresponding to the constellation point 151 when the received signal corresponding to the constellation point 161 is received. When a symbol corresponding to the constellation point 152 is transmitted by the transmitter, the receiver receives a received signal corresponding to a constellation point 162 included in the constellation 160 despite an occurrence of fading in the Q channel. The receiver determines a symbol transmitted by the transmitter to be the symbol corresponding to the constellation point 152 when the received signal corresponding to the constellation point 162 is received. Similar principles may be applied to a received signal corresponding to one of constellation points 163 and 164 included in the constellation 160. As such, a diversity gain is generated when the rotated QAM symbol is used, compared to when the general QAM symbol is used.

Figure 2A:
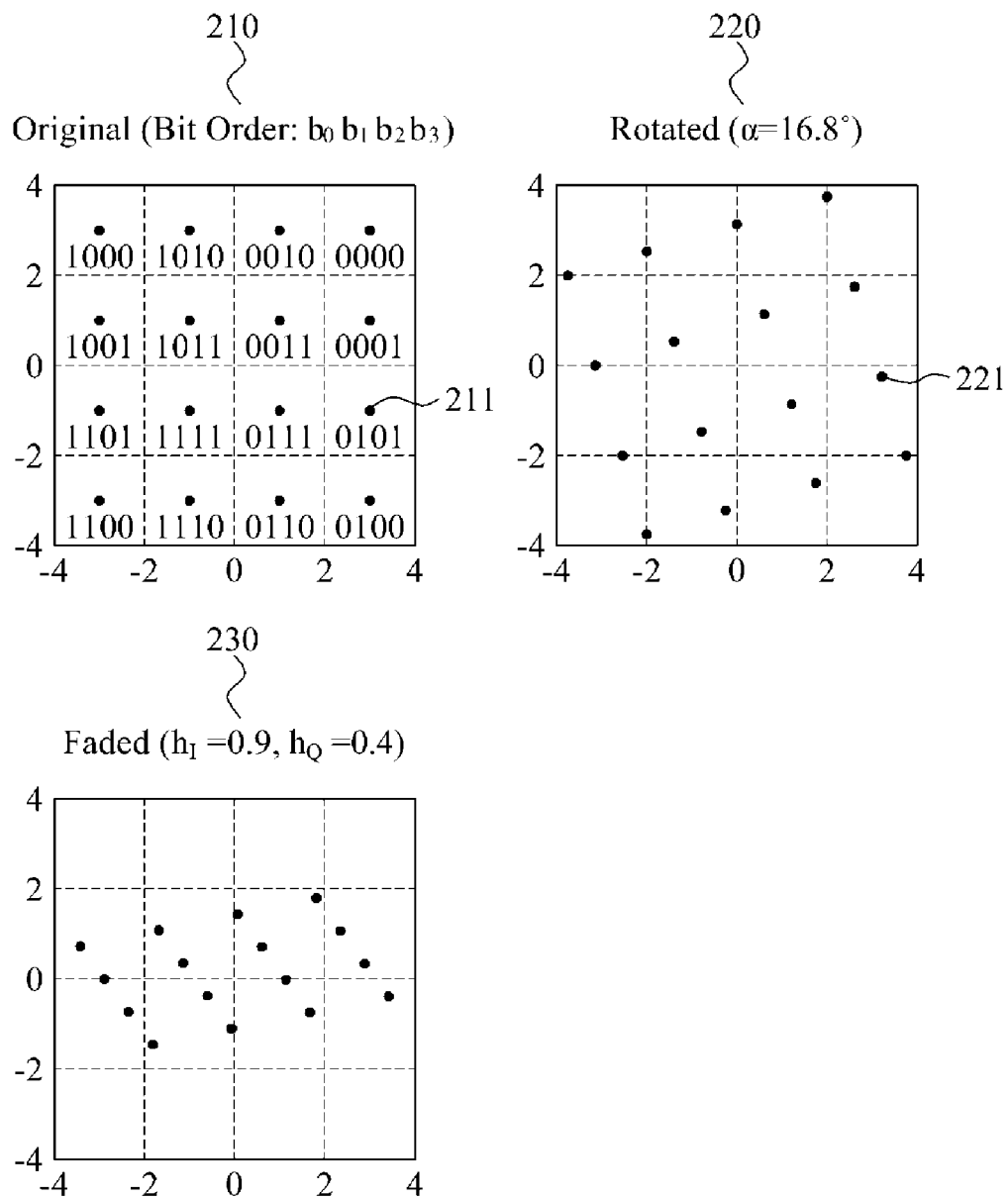
FIG. 2A is a diagram illustrating an example of an original 16 QAM, a rotated 16 QAM, and a faded 16 QAM.

FIG. 2A illustrates an example of an original 16 QAM, a rotated 16 QAM, and a faded 16 QAM. Hereinafter, for conciseness and ease of description, an example of a 16 QAM is used; however, various details pertaining to description of a 16 QAM may be applied to variations, for example, a 64 QAM or a 256 QAM, and a non-squared 32 QAM or a 128 QAM.

Referring to FIG. 2A, an original 16 QAM constellation 210 includes 16 constellation points. A bit order of the original 16 QAM constellation 210 is assumed to be $b_0$-$b_1$-$b_2$-$b_3$. An index, for example, "1" or "3", of even-numbered bits, for example, $b_1$ or $b_3$, corresponds to an odd number, and an index, for example, "0" or "2", of odd-numbered bits, for example, $b_0$ or $b_2$, corresponds to an even number, among a plurality of bits included in a symbol. Each of the 16 constellation points included in the original 16 QAM constellation 210 includes information represented in four bits. For example, each of the 16 constellation points corresponds to "0000" to "1111". Each of the 16 constellation points corresponds to one from "0000" to "1111" based on a position disposed in the original 16 QAM constellation 210. For example, based on a gray encoding method, bits, from "0000" to "1111", corresponding to adjacent constellation points in the original 16 QAM constellation 210, are allocated to the 16 constellation points, respectively, to allow a single digit difference in a four-digit bit value. Bit information illustrated in FIG. 2A is merely an example, and may be modified to various forms.

When the original 16 QAM constellation 210 is rotated by a rotation angle "α", a rotated 16 QAM constellation 220 is obtained. A transmitter transmits data using 16 constellation points included in the rotated 16 QAM constellation 220. For example, the transmitter transmits a symbol corresponding to a constellation point 221 in order to transmit "0101". The constellation point 221 is a rotated constellation point obtained through the constellation point 211 corresponding to "0101" being rotated by the rotation angle "α" from the original 16 QAM constellation 210.

When the rotated 16 QAM constellation 220 is faded in an I channel and/or a Q channel, a faded rotated 16 QAM constellation 230 is obtained. When a rotated 16 QAM to which a Q delay is introduced is used, a degree of the I channel differs from a degree of the Q channel being faded. For example, the faded rotated 16 QAM constellation 230 is a constellation of when a size "$h_I$" of the I channel is "0.9", and a size "$h_Q$" of the Q channel is "0.4". Constellation points of the faded rotated 16 QAM constellation 230 are disposed by being scaled down by a degree of "0.9" in an x axis direction corresponding to the I channel because the size "$h_I$" of the I channel of the faded rotated 16 QAM constellation 230 is "0.9", when compared to constellation points of the rotated 16 QAM constellation 220. Constellation points of the faded rotated 16 QAM constellation 230 are disposed by being scaled down by a degree of "0.4" in an y axis direction corresponding to the Q channel because the size "$h_Q$" of the Q channel of the faded rotated 16 QAM constellation 230 is "0.4", when compared to constellation points of the rotated 16 QAM constellation 220. Accordingly, the faded rotated 16 QAM constellation 230 is no longer provided in a regular shape.

The rotated 16 QAM constellation 220 may be a constellation used in a transmitter, and the faded rotated 16 QAM constellation 230 may be a constellation used in a receiver. For example, when a rotated 16 QAM symbol generated based on the rotated 16 QAM constellation 220 undergoes fading while being transmitted, the receiver restores a received signal based on the faded rotated 16 QAM constellation 230.

An apparatus that performs a soft demapping, hereinafter also referred to as a soft demapping apparatus, estimates bit information from a received signal. The soft demapping apparatus generates information to be used to decode a plurality of bits transmitted by the transmitter from the received signal. For example, the soft demapping apparatus calculates a log-likelihood ratio (LLR) for the plurality of bits, using the received signal. The LLR for the plurality of bits that is calculated by the soft demapping apparatus is used to decode the plurality of bits. Description pertaining to a method of calculating an LLR for a plurality of bits will be discussed with reference to FIG. 2B.

FIG. 2B illustrates an example of constellations for a plurality of bits. Referring to FIG. 2B, each of a constellation 240 for a single bit $b_0$, a constellation 250 for a single bit $b_1$, a constellation 260 for a single bit $b_2$, and a constellation 270 for a single bit $b_3$ includes constellation points disposed at a position identical to the constellation points included in the faded rotated 16 QAM constellation 230 of FIG. 2A. The constellation points included in the constellation 240 for the single bit $b_0$, the constellation 250 for the single bit $b_1$, the constellation 260 for the single bit $b_2$, and the constellation 270 for the single bit $b_3$ are partitioned based on a logic value of a corresponding bit. In FIG. 2B, a solid dot • denotes a constellation point defined by $b_i=1$, and a hollow dot ○ denotes a constellation point derived from $b_i=0$.

For example, the constellation points included in the constellation 240 for the single bit $b_0$ are partitioned to a sub-set 241 of which a logic value of the single bit $b_0$ is "1" and a sub-set 242 of which a logic value of the single bit $b_0$ is "0". The logic value of the single bit $b_0$ for each of the constellation points is identical to the logic value of a first bit $b_0$ indicated in the original 16 QAM constellation 210 of FIG. 2A. The constellation points included in the constellation 250 for the single bit $b_1$ are partitioned to a sub-set 251 of which a logic value of the single bit $b_1$ is "1" and a sub-set 252 of which a logic value of the single bit $b_1$ is "0". The logic value of the single bit $b_1$ in each of the constellation points is identical to the logic value of a second bit $b_1$ indicated in the original 16 QAM constellation 210 of FIG. 2A. The constellation points included in the constellation 260 for the single bit $b_2$ are partitioned to a sub-set 261 of which a logic value of the single bit $b_2$ is "1" and a sub-sets 262 and 263 of which a logic value of the single bit $b_2$ is "0". The logic value of the single bit $b_2$ in each of the constellation points is identical to the logic value of a third bit $b_2$ indicated in the original 16 QAM constellation 210 of FIG. 2A. The constellation points included in the constellation 270 for the single bit $b_3$ are partitioned to a sub-set 271 of which a logic value of the single bit $b_3$ is "1" and sub-sets 272 and 273 of which a logic value of the single bit $b_3$ is "0". The logic value of the single bit $b_3$ in each of the constellation points is identical to the logic value of a fourth bit $b_3$ indicated in the original 16 QAM constellation 210 of FIG. 2A. Partition information illustrated in FIG. 2B is merely an example, and partitions of the constellations 240, 250, 260, and 270 for a single bit may be subject to change based on a change in the bit information illustrated in FIG. 2A.

When compared to using the general QAM, a great calculation complexity may be involved in using the rotated QAM for the receiver to perform a soft demapping. When the general QAM is used, an LLR may be calculated by a one-dimensional (1D) calculation because an I component and a Q component are independent from each other. Conversely, when the rotated QAM is used, a two-dimensional (2D) calculation may be needed for all constellation points included in a constellation due to a correlation between an I component and a Q component.

When the rotated QAM is used, an LLR of a received signal "r" may need to be calculated for each bit $b_i$ among a plurality of bits included in a symbol in order to perform a soft demapping. The LLR with respect to a single bit $b_i$ is defined by Equation 3.

$$LLR(b_i) = \log \frac{\sum_{\tilde{s} \in \mathbb{S}_{b_i}=1} e^{-\frac{(r_I-h_I \tilde{s}_I)^2+(r_Q-h_Q \tilde{s}_Q)^2}{2\sigma^2}}}{\sum_{\tilde{s} \in \mathbb{S}_{b_i}=0} e^{-\frac{(r_I-h_I \tilde{s}_I)^2+(r_Q-h_Q \tilde{s}_Q)^2}{2\sigma^2}}}.$$ [Equation 3]

In Equation 3, $LLR(b_i)$ denotes an LLR with respect to an "i"-th single bit among the plurality of bits included in the symbol. $\sigma^2$ denotes a magnitude of noise, $\mathbb{S}\, b_i=1$ denotes a sub set related to $b_i=1$, and $\mathbb{S}\, b_i=0$ denotes a sub set related to $b_i=0$.

Based on MAX-log approximation, the LLR may be represented by Equation 4.

$$LLR(b_i) \approx \frac{1}{2\sigma^2}\left[\min_{\tilde{s}\in\mathbb{S}_{b_i}=0}((r_I-h_I\tilde{s}_I)^2+(r_Q-h_Q\tilde{s}_Q)^2) - \min_{\tilde{s}\in\mathbb{S}_{b_i}=1}((r_I-h_I\tilde{s}_I)^2+(r_Q-h_Q\tilde{s}_Q)^2)\right].$$ [Equation 4]

Referring to Equation 4, an LLR calculation with respect to a single bit $b_i$ depends on a Euclidean distance between constellation points in two substantially different sets, for example, a set related to $b_i=0$ and a set related to $b_i=1$, and a received signal "r" (denoted as "+" in FIG. 2B). A constellation point closest to the received signal "r" in the set related to $b_i=0$ and a constellation point closest to the received signal "r" in the set related to $b_i=1$ may need to be determined to calculate the LLR with respect to the single bit $b_i$ based on Equation 4. Calculating a distance between the received signal "r" and all of the constellation points for the LLR calculation may be a direct method of detecting transmitted bits. However, complexity of such a full search algorithm may be overly large for actual implementation.

A soft demapping apparatus may provide technology that may calculate an LLR with respect to an accuracy that is substantially identical to an accuracy of when the distance between the received signal "r" and all of the constellation points is calculated without actually calculating the distance between the received signal "r" and all of the constellation points. For example, the soft demapping apparatus may calculate an LLR by calculating a distance between selected candidate constellation points and a received signal, subsequent to selecting a single candidate constellation point for a plurality of lines formed by a plurality of constellation points in a constellation. Further descriptions pertaining to a method of selecting a candidate constellation point will be provided later.

Figure 3A:
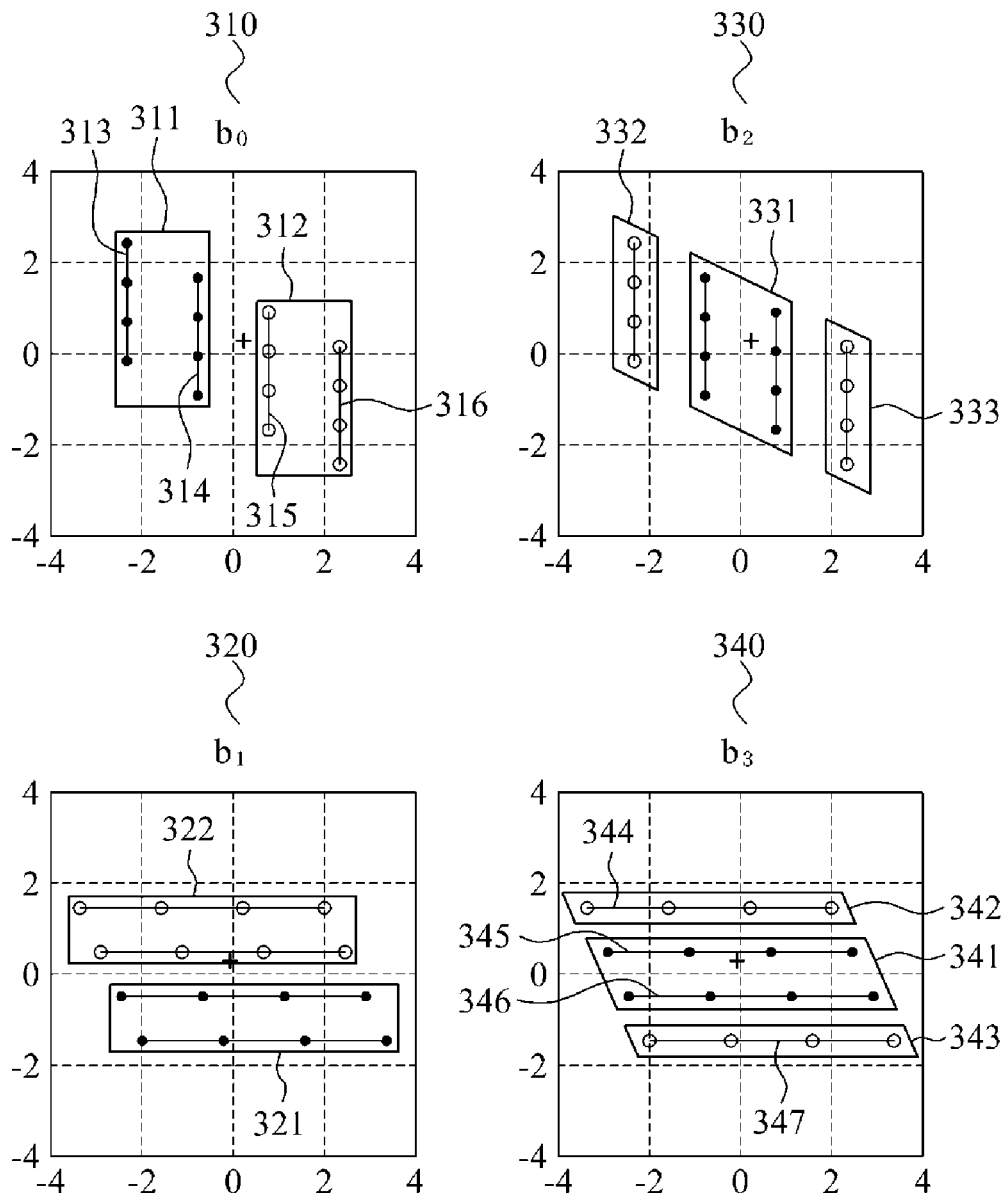
FIG. 3A is a diagram illustrating an example of a vertical 16 QAM constellation and a horizontal 16 QAM constellation for log-likelihood ratio (LLR) calculation for a plurality of bits.

FIG. 3A illustrates an example of a vertical 16 QAM constellation and a horizontal 16 QAM constellation for LLR calculation for a plurality of bits. Referring to FIG. 3A, a soft demapping apparatus rotates the constellations 240, 250, 260, and 270 of FIG. 2B, in a reverse direction, to allow constellation points included in the constellations 240, 250, 260, and 270 to be provided in a form of a horizontally parallel shape or vertically parallel shape in order to select candidate constellation points. For example, the soft demapping apparatus obtains a constellation 310 for a single bit $b_0$ by rotating the constellation 240 of FIG. 2B, in a reverse direction, obtains a constellation 320 for a single bit $b_1$ by rotating the constellation 250 of FIG. 2B, in a reverse direction, obtains a constellation 330 for a single bit $b_2$ by rotating the constellation 260 of FIG. 2B, in a reverse direction, and obtains a constellation 340 for a single bit $b_3$ by rotating the constellation 270 of FIG. 2B, in a reverse direction.

The constellation points included in the constellation 310 for the single bit $b_0$, the constellation 320 for the single bit $b_1$, the constellation 330 for the single bit $b_2$, and the constellation 340 for the single bit $b_3$ are partitioned based on a logic value of a corresponding bit. In FIG. 3A, a solid dot • denotes a constellation point defined by $b_i=1$, and a hollow dot ○ denotes a constellation point derived from $b_i=0$. The constellation points included in the constellation 310 for the single bit $b_0$ are partitioned to a sub-set 311 of which a logic value of the single bit $b_0$ is "1" and a sub-set 312 of which a logic value of the single bit $b_0$ is "0". The constellation points included in the constellation 320 for the single bit $b_1$ are partitioned to a sub-set 321 of which a logic value of the single bit $b_1$ is "1" and a sub-set 322 of which a logic value of the single bit $b_1$ is "0". The constellation points included in the constellation 330 for the single bit $b_2$ are partitioned to a sub-set 331 of which a logic value of the single bit $b_2$ is "1" and sub-sets 332 and 333 of which a logic value of the single bit $b_2$ is "0". The constellation points included in the constellation 340 for the single bit $b_3$ are partitioned to a sub-set 341 of which a logic value of the single bit $b_3$ is "1" and sub-sets 342 and 343 of which a logic value of the single bit $b_3$ is "0". Partition information illustrated in FIG. 3A is merely an example, and partitions of the constellations 310, 320, 330, and 340 rotated in the reverse direction for the single bits may be subject to change based on a change in the bit information illustrated in FIG. 2A.

However, partitions may not necessarily require a received constellation to be rotated in a reverse direction. Also, examples provided herein may be applied to a constellation in a vertically parallel shape or a horizontally parallel shape, and to a constellation in an irregular shape.

The constellation 310 for the single bit $b_0$ and the constellation 330 for the single bit $b_2$ have constellation points in a vertically parallel shape by being rotated in a reverse direction. Constellation points in an identical column with respect to the constellation points in a vertically parallel shape belong to the same sub-set. For example, in the constellation 310 for the single bit $b_0$, constellation points on a first line 313 corresponding to a first column all belong to the sub-set 311, and constellation points on a second line 314 corresponding to a second column all belong to the sub-set 311. Constellation points on a third line 315 corresponding to a third column all belong to the sub-set 312, and constellation points on a fourth line 316 corresponding to a fourth column all belong to the sub-set 312.

Figure 3B:
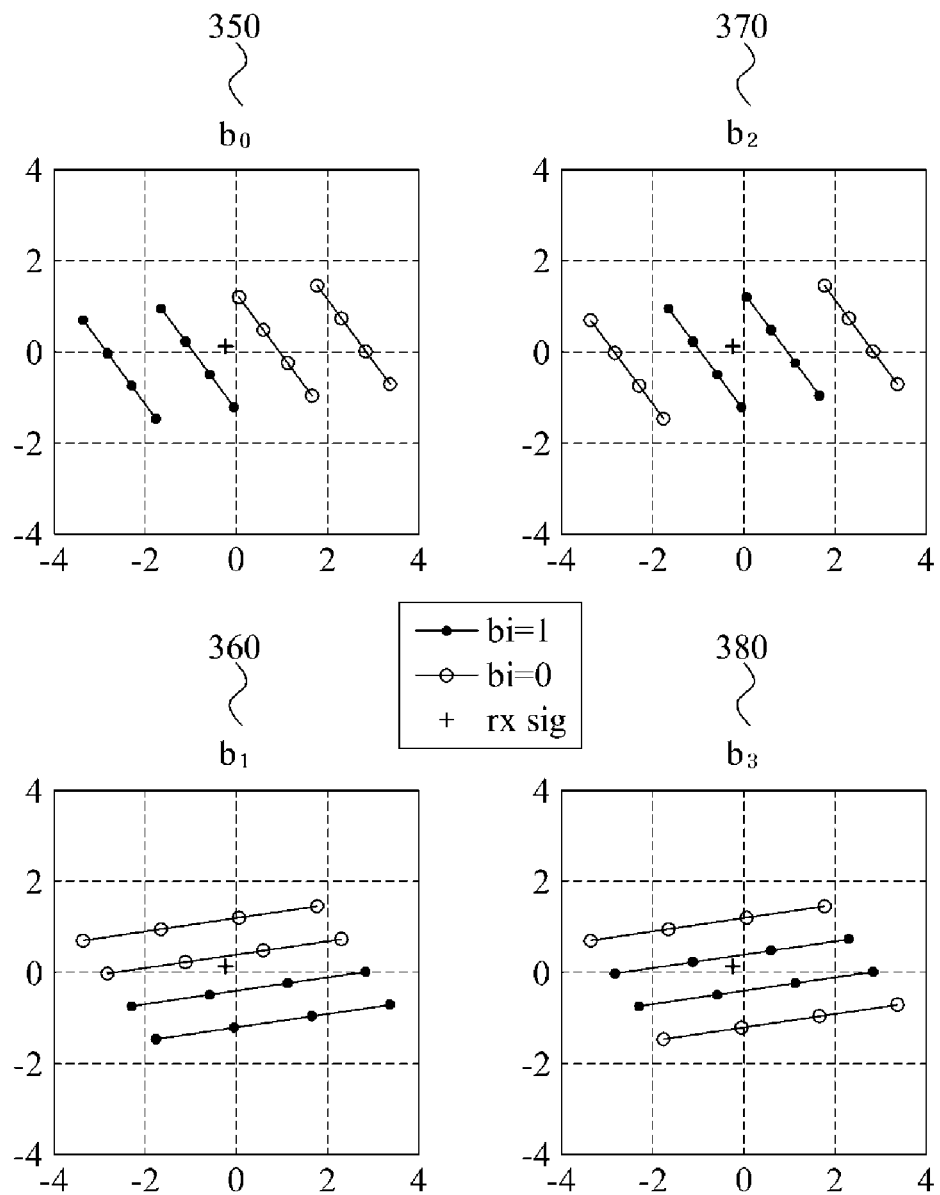
FIG. 3B is a diagram illustrating an example of a non-vertical 16 QAM constellation or a non-horizontal 16 QAM constellation for LLR calculation for a plurality of bits.

The constellation 320 for the single bit $b_1$ and the constellation 340 for the single bit $b_3$ have constellation points in a horizontally parallel shape. Constellation points in an identical row with respect to the constellation points in a horizontally parallel shape belong to the same sub-set. For example, in the constellation 340 for the single bit $b_3$, constellation points on a fifth line 344 corresponding to a first row all belong to the sub-set 342, and constellation points on a sixth line 345 corresponding to a second row all belong to the sub-set 341. Constellation points on a seventh line 346 corresponding to a third row all belong to the sub-set 341, and constellation points on an eighth line 347 corresponding to a fourth row all belong to the sub-set 343. Lines illustrated in FIG. 3B are merely examples, and lines of constellations 350, 360, 370, and 380 for single bits may be subject to change based on a change in the bit information shown in FIG. 2A.

Due to such characteristics, a soft demapping algorithm may be simplified. The soft demapping apparatus selects a single candidate closest to a received signal for each column from the constellations 310 and 330 for an odd-numbered bit, and selects a single candidate closest to a received signal for each row from the constellations 320 and 340 for an even-numbered bit. By way of example, in a vertically parallel shape, a best candidate, for example, a constellation point having a minimum distance to a received signal in a single column, is determined.

The soft demapping apparatus need not calculate a distance between the received signal and the constellation points in order to select candidates. The soft demapping apparatus vertically projects the received signal to each row or each column, and selects a constellation point closest to a point at which the received signal is projected as a candidate for a corresponding row or a corresponding column. For example, a best candidate in a single column may be easily determined by vertically projecting a received signal to a corresponding column A constellation point closest to the point at which the received signal is vertically projected to the corresponding column is determined to be the best candidate for the corresponding column Such a process is performed with respect to a plurality of columns, and a reduced number of candidate sets may be obtained by collecting a best candidate for each column.

Subsequent to selecting the candidates, the soft demapping apparatus calculates an LLR by calculating a distance between the selected candidates and the received signal. For example, a Euclidean distance between a received signal "r" and a best candidate may be calculated. When an M-QAM symbol is used, where "$M=2^n$", and "n" is an integer greater than two, an LLR may be calculated by calculating a distance between a $\sqrt{M}$ number of constellation points and a received signal, rather than calculating a distance between a total of "M" number of constellation points and a received signal.

Constellation points having a minimum distance obtained by using the reduced $\sqrt{M}$ number of candidate sets are identical to constellation points having a minimum distance obtained by using the total of "M" number of point sets. Accordingly, the soft demapping apparatus provides technology for calculating an accurate LLR devoid of a corner case, without calculating a 2D distance between all the constellation points and the received signal. Further descriptions pertaining to the simplified soft demapping algorithm will be discussed with reference to FIGS. 4A and 4B later.

FIG. 3B illustrates an example of a non-vertical 16 QAM constellation or a non-horizontal 16 QAM constellation for LLR calculation for a plurality of bits. Referring to FIG. 3B, as described above, it should be noted that a vertically parallel shape or a horizontally parallel shape are not essentially required in examples provided herein. The constellation 350 for the single bit $b_0$ and the constellation 370 for the single bit $b_2$ have constellation points in a form rotated by a predetermined degree in an anti-clockwise direction from a vertically parallel shape. Constellation points on an identical line with respect to the constellation points in the form rotated by the predetermined degree in the anti-clockwise direction from the vertically parallel shape, belong to the same sub-set at all times. The constellation 360 for the single bit $b_1$ and the constellation 380 for the single bit $b_3$ have constellation points in a form rotated by a predetermined degree in an anti-clockwise direction from a horizontally parallel shape. Constellation points on an identical line with respect to the constellation points in the form rotated by the determined degree in the anti-clockwise direction from the horizontally parallel shape, belong to the same sub-set at all times. As described in the preceding with respect to FIG. 3A, due to such characteristics, the soft demapping algorithm may be simplified.

FIG. 4A illustrates an example of selecting a candidate for LLR calculation in a vertical 16 QAM constellation and a horizontal 16 QAM constellation. Referring to FIG. 4A, each of four columns in constellations 410 and 420 includes four constellation points, and each of four rows in constellations 430 and 440 includes four constellation points.

Assuming an example of the constellation 410 having constellation points in a vertically parallel shape, a single best candidate may be readily determined for a plurality of columns According to an example, a best candidate is determined without calculating four distances between four constellation points in a single column and a received signal. A soft demapping apparatus vertically projects a received signal 415 to each column, and selects a constellation point closest to a point at which the received signal 415 is horizontally projected as a best candidate for a corresponding column. The soft demapping apparatus readily determines the constellation point closest to the projection point because an interval between the constellation points included in each column in the constellation 410 is predetermined to be "$d_v$" 416. For example, a point 412 at which the received signal 415 is projected to a column 411 is disposed between a constellation point (2, 1) and a constellation point (3, 1). A best candidate for the column 411 is determined to be the constellation point (3, 1) because the interval between the constellation point (2, 1) and the constellation point (3, 1) is "$d_v$" 416, and the projection point 412 is within a distance of "$d_v/2$" from the constellation point (3, 1). In a similar manner, best candidates in the constellation 410 are determined to be (3, 1), (3, 2), (2, 3), and (2, 4). The soft demapping apparatus calculates an LLR for a corresponding bit based on a single best candidate for each column.

Through this, an entire LLR calculation process may be simplified. Referring to Equation 4 provided in the foregoing, a constellation point closest to the received signal 415 in a sub-set of which a logic value of $b_0$ is "1" and a constellation point closest to the received signal 415 in a sub-set of which a logic value of $b_0$ is "0" need to be determined in order to calculate an LLR for a single bit $b_0$. The soft demapping apparatus calculates an LLR with respect to an accuracy that is identical to an accuracy of an example in which a distance between all constellation points and a received signal is calculated by calculating a distance between four best candidates selected for each column and a received signal. In the constellation 410, the constellation point closest to the received signal 415 in the sub-set of which the logic value of $b_0$ is "1" corresponds to the constellation point (3, 2), and the constellation point closest to the received signal 415 in the sub-set of which the logic value of $b_0$ is "0" corresponds to the constellation point (2, 3).

In this example, a reduced number of candidate sets may be used in common. Referring to the constellation 410 and the constellation 420 of FIG. 4A, candidates with respect to $b_0$ and $b_2$ are identical to one another. For example, the constellation points (3, 1), (3, 2), (2, 3), and (2, 4) are the candidates with respect to $b_0$ and $b_2$. A difference is that each of the candidates may belong to a different sub-set for a plurality of differing bits. For example, (3, 1) belongs to a sub-set related to "$b_0=1$" in the constellation 410, and (3, 1) belongs to a sub-set related to "$b_2=0$" in the constellation 420. Indices of candidates included in a reduced number of candidate sets with respect to a predetermined bit and a pre-calculated distance between the candidates and a received signal may also be used for other bits as a lookup table (LUT). For example, distances between each of best candidate constellation points (3, 1), (3, 2), (2, 3), and (2, 4) for each column with respect to $b_0$ and a received signal are calculated. Indices of the constellation points (3, 1), (3, 2), (2, 3), and (2, 4) are recorded in the LUT. The distances between the constellation points (3, 1), (3, 2), (2, 3), and (2, 4) and the received signal are recorded in the LUT. The LUT may be re-used for a process of calculating an LLR with respect to bit $b_2$. In the constellation 420, a constellation point closest to a received signal in a sub-set of which a logic value of $b_2$ is "1" corresponds to the constellation point (3, 2) and a constellation point closest to a received signal in a sub-set of which a logic value of $b_2$ is "0" corresponds to the constellation point (3, 1).

In a similar manner, assuming an example of the constellation 430 having constellation points in a horizontally parallel shape, a single best candidate may be readily determined for a plurality of rows. According to an example, a best candidate is determined without calculating four distances between four constellation points in a single row and a received signal. The soft demapping apparatus vertically projects a received signal 435 to each row, and selects a constellation point closest to a point at which the received signal 435 is vertically projected as a best candidate for a corresponding row. The soft demapping apparatus readily determines the constellation point closest to the projection point because an interval between constellation points included in each row in the constellation 430 is predetermined to be "$d_n$" 436. In a similar manner, best candidates in the constellation 430 are determined to be (1, 3), (2, 3), (3, 2), and (4, 2). The soft demapping apparatus calculates an LLR for a corresponding bit based on a single best candidate for each row.

Through this, an entire LLR calculation process may be simplified. Referring to Equation 4 provided in the preceding, a constellation point closest to the received signal 435 in a sub-set of which a logic value of $b_1$ is "1" and a constellation point closest to the received signal 435 in a sub-set of which a logic value of $b_1$ is "0" need to be determined in order to calculate an LLR for a single bit $b_1$. The soft demapping apparatus calculates an LLR in an accuracy identical to an accuracy of an example of calculating a distance between all constellation points and a received signal by calculating a distance between four best candidates selected for each row and a received signal. In the constellation 430, the constellation point closest to the received signal 435 in the sub-set of which the logic value of $b_1$ is "1" corresponds to the constellation point (3, 2), and the constellation point closest to the received signal 435 in the sub-set of which the logic value of $b_1$ is "0" corresponds to the constellation point (2, 3).

In this example, a reduced number of candidate sets may be used in common. Referring to the constellation 430 and the constellation 440 of FIG. 4A, candidates with respect to $b_1$ and $b_3$ are identical to one another. For example, the constellation points (1, 3), (2, 3), (3, 2), and (4, 2) are the candidates with respect to $b_1$ and $b_3$. A difference is that each of the candidates may belong to a different sub-set for a plurality of differing bits. For example, (4, 2) belongs to a sub-set related to "$b_1=1$" in the constellation 430, and (4, 2) belongs to a sub-set related to "$b_3=0$" in the constellation 440. Indices of candidates included in a reduced number of candidate sets with respect to a predetermined bit and a pre-calculated distance between the candidates and a received signal may also be used for other bits as an LUT. For example, distances between each of best candidate constellation points (1, 3), (2, 3), (3, 2), and (4, 2) for each row with respect to $b_1$ and a received signal are calculated. Indices of the constellation points (1, 3), (2, 3), (3, 2), and (4, 2) are recorded in the LUT. The distances between the constellation points (1, 3), (2, 3), (3, 2), and (4, 2) and the received signal are recorded in the LUT. The LUT may be re-used for a process of calculating an LLR with respect to $b_3$. In the constellation 440, a constellation point closest to a received signal in a sub-set of which a logic value of $b_3$ is "1" corresponds to the constellation point (3, 2) and a constellation point closest to a received signal in a sub-set of which a logic value of $b_3$ is "0" corresponds to the constellation point (4, 2).

Figure 4B:
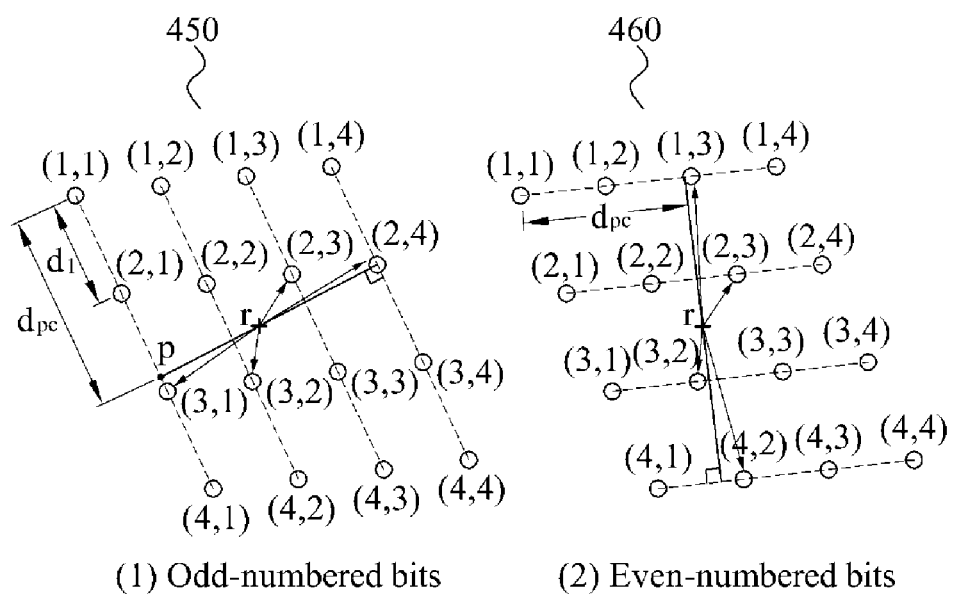
FIG. 4B is a diagram illustrating an example of selecting a candidate for LLR calculation in a non-vertical 16 QAM constellation or a non-horizontal 16 QAM constellation.

FIG. 4B illustrates an example of selecting a candidate for LLR calculation in a non-vertical 16 QAM constellation or a non-horizontal 16 QAM constellation. Referring to FIG. 4B, a vertically parallel shape or a horizontally parallel shape are not essentially required in examples provided herein. A single best candidate for a plurality of lines is easily determined. For example, a received signal is vertically projected to the plurality of lines, and a single best candidate for a corresponding line may be determined.

An LLR for a corresponding bit is calculated based on a single best candidate for a plurality of lines, instead of calculating all distances between constellation points for the plurality of lines and a received signal and calculating LLRs based on the calculated distances. Accordingly, an entire LLR calculation process may be simplified. Referring to the constellation 450, a distance between each of best candidate constellation points (3, 1), (3, 2), (2, 3), and (2, 4) for a plurality of lines with respect to odd-numbered bits, for example, $b_0$ and $b_2$, and a received signal r is calculated. Indices of the constellation points (3, 1), (3, 2), (2, 3), and (2, 4) are recorded in the LUT. The distances between the constellation points (3, 1), (3, 2), (2, 3), and (2, 4) and the received signal are recorded in the LUT. The LUT may be re-used for a process of calculating an LLR with respect to other bits. Referring to the constellation 460, a distance between each of best candidate constellation points (1, 3), (2, 3), (3, 2), and (4, 2) for a plurality of lines with respect to even-numbered bits, for example, $b_1$ and $b_3$, and a received signal r is calculated. Indices of the constellation points (1, 3), (2, 3), (3, 2), and (4, 2) are recorded in the LUT. The distances between the constellation points (1, 3), (2, 3), (3, 2), and (4, 2) and the received signal are recorded in the LUT. The LUT may be re-used for a process of calculating an LLR with respect to other bits.

In FIG. 4B, $d_1$ represents a distance between constellation points. Also, $d_{pc}$ represents a distance between the constellation point (1,1) and a projection point p at which a corresponding line and a projection of a received signal intersects.

Figure 5:
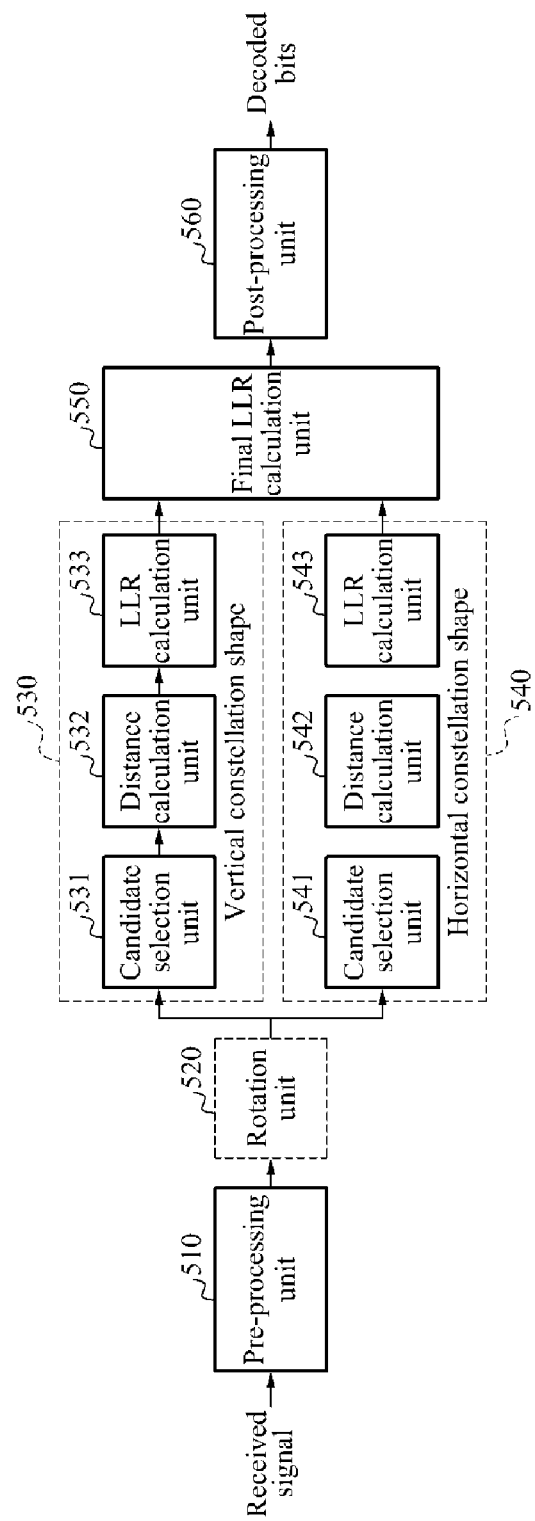
FIG. 5 is a block diagram illustrating an example of a soft demapping apparatus.

FIG. 5 illustrates an example of a soft demapping apparatus. The soft demapping apparatus includes a selection unit and a calculation unit. The selection unit selects a candidate constellation point for each of a plurality of lines formed by a plurality of constellation points in a constellation for a single bit among a plurality of bits included in a symbol used for data transmission, based on a received signal. The calculation unit calculates an LLR with respect to the single bit based on the received signal and the selected candidate constellation points. Referring to FIG. 5, the selection unit included in the soft demapping apparatus includes candidate selection units 531 and/or 541, and the calculation unit includes distance calculation units 532 and/or 542 and LLR calculation units 533 and/or 543. The soft demapping apparatus further includes a pre-processing unit 510, a final LLR calculation unit 550, and a post-processing unit 560.

The pre-processing unit 510 obtains a received signal from a symbol representing a plurality of bits that is transmitted from a transmitter. As used herein, the symbol refers to an M-QAM symbol, where "M"=$2^n$ and "n" is an integer greater than two.

According to an example, the soft demapping apparatus may further include a rotation unit 520. The rotation unit 520 rotates a constellation of a received signal, in a reverse direction, to allow the constellation to be provided in a form of a vertically parallel shape or a horizontally parallel shape. When the constellation of the received signal is rotated in a reverse direction, the reversely rotated constellation has a vertically parallel shape or a horizontally parallel shape as shown in FIG. 4A. However, referring to FIG. 4B, examples may not necessarily require the constellation to be in the vertically parallel shape or the horizontally parallel shape. Hereinafter, an example of the rotation unit 520 rotating a constellation of a received signal, in a reverse direction, to allow the constellation to be provided in a form of a vertically parallel shape or a horizontally parallel shape will be used for ease of description.

When a constellation is provided in a form of a vertically parallel shape or a horizontally parallel shape, a received signal is processed individually by the block 530 with respect to the constellation in a vertically parallel shape or by the block 540 with respect to the constellation in a horizontally parallel shape. In detail, the block 530 calculates an LLR for a plurality of bits corresponding to the vertical constellation shape, and the block 540 calculates an LLR for a plurality of bits corresponding to the horizontal constellation shape.

Each of the candidate selection units 531 and 541 select at least two candidates from constellation points included in a constellation rotated in a reverse direction with respect to a plurality of bits. For example, in the constellation 410 of FIG. 4A, a single point is selected as a candidate for each column including a $\sqrt{M}$ number of constellation points. In a similar manner, in the constellation 430 of FIG. 4A, a single point is selected as a candidate for each row including a $\sqrt{M}$ number of constellation points. Each of the candidate selection units 531 and 541 selects at least one candidate with respect to an example in which each of the plurality of bits from among the constellation points included in the constellation corresponds to a first logic value, and select at least one alternative candidate with respect to an example in which each of the plurality of bits from among the constellation points included in the constellation corresponds to a second logic value. For example, in the constellation 410 of FIG. 4A, constellation points (2, 3) and (2, 4) are selected as candidates with respect to an example in which $b_0$ bit is "0", and constellation points (3, 1) and (3, 2) are selected as candidates with respect to an example in which $b_0$ bit is "1".

Each of the distance calculation units 532 and 542 calculates a Euclidean distance between a received signal and each of at least two candidates. For example, in the constellation 410 of FIG. 4A, Euclidean distances from the received signal to constellation points (3, 1), (3, 2), (2, 3), and (2, 4) are calculated for LLR calculation of $b_0$. The Euclidean distances from the received signal to the calculated constellation points (3, 1), (3, 2), (2, 3), and (2, 4) are stored in an LUT for LLR calculation of $b_2$. Indices of the constellation points (3, 1), (3, 2), (2, 3), and (2, 4) are stored along with the Euclidean distances from the received signal to the calculated constellation points (3, 1), (3, 2), (2, 3), and (2, 4). In a similar manner, in the constellation 430 of FIG. 4A, Euclidean distances from the received signal to constellation points (1, 3), (2, 3), (3, 2), and (4, 2) are calculated for LLR calculation of $b_1$. The Euclidean distances from the received signal to the calculated constellation points (1, 3), (2, 3), (3, 2), and (4, 2) are stored in an LUT for LLR calculation of $b_3$. Indices of the constellation points (1, 3), (2, 3), (3, 2), and (4, 2) are stored along with the Euclidean distances from the received signal to the calculated constellation points (1, 3), (2, 3), (3, 2), and (4, 2).

Each of the LLR calculation units 533 and 543 calculates an LLR with respect to the plurality of bits based on the Euclidean distance between the received signal and each of the at least two candidates. For example, the LLR calculation unit 533 calculates an LLR of $b_0$, using the Euclidean distances from the received signal to the constellation points (3, 1), (3, 2), (2, 3), and (2, 4) calculated by the distance calculation unit 532. In more detail, the LLR calculation unit 533 calculates an LLR of $b_0$ using a constellation point of which a Euclidean distance is least among constellation points with respect to an example in which $b_0$ is "0" and a constellation point of which a Euclidean distance is least among the constellation points with respect to an example in which $b_0$ is "1". The Euclidean distance from the received signal to the constellation point (2, 3) is used for the example in which $b_0$ is "0", and the Euclidean distance from the received signal to the constellation point (3, 2) is used for the example in which $b_0$ is "1"

In another example, the LLR calculation unit 543 calculates an LLR of $b_1$, using the Euclidean distances from the received signal to the constellation points (1, 3), (2, 3), (3, 2), and (4, 2) calculated by the distance calculation unit 542. In more detail, the LLR calculation unit 543 calculates an LLR of $b_1$ using a constellation point of which a Euclidean distance is least among constellation points with respect to an example in which $b_1$ is "0" and a constellation point of which a Euclidean distance is least among the constellation points with respect to an example in which $b_1$ is "1". The Euclidean distance from the received signal to the constellation point (2, 3) is used for the example in which $b_1$ is "0", and the Euclidean distance from the received signal to the constellation point (3, 2) is used for the example in which $b_1$ is "1".

The Euclidean distance between the received signal and each of the at least two candidates and an index for each of the at least two candidates are stored in the LUT with respect to a predetermined bit. Each of the LLR calculation units 533 and 543 calculates an LLR with respect to another bit, using the Euclidean distance between the received signal and each of the at least two candidates and the index for each of the at least two candidates with respect to the predetermined bit, stored in the LUT. For example, the LLR calculation unit 533 calculates an LLR of $b_2$, using the Euclidean distances and the indices stored in the LUT. In more detail, the LLR calculation unit 533 calculates an LLR of $b_2$, using a constellation point of which a Euclidean distance is least among constellation points with respect to an example in which $b_2$ is "0" and a constellation point of which a Euclidean distance is least among the constellation points with respect to an example in which $b_2$ is "1". The Euclidean distance from the received signal to the constellation point (3, 1) is used for the example in which $b_2$ is "0", and the Euclidean distance from the received signal to the constellation point (3, 2) is used for the example in which $b_2$ is "1"

In another example, the LLR calculation unit 543 calculates an LLR of $b_3$, using the Euclidean distances and the indices stored in the LUT. In more detail, the LLR calculation unit 543 calculates an LLR of $b_3$, using a constellation point of which a Euclidean distance is least among constellation points with respect to an example in which $b_3$ is "0" and a constellation point of which a Euclidean distance is least among the constellation points with respect to an example in which $b_3$ is "1". The Euclidean distance from the received signal to the constellation point (4, 2) is used for the example in which $b_3$ is "0", and the Euclidean distance from the received signal to the constellation point (3, 2) is used for the example in which $b_3$ is "1".

The final LLR calculation unit 550 combines LLRs for a plurality of bits in order to detect the plurality of bits. LLRs with respect to $\{b_0, b_2, \ldots b_{n-2}\}$ and $\{b_1, b_3, \ldots b_{n-1}\}$ are combined. The post-processing unit 560 decodes the plurality of bits, using the combined LLRs. Descriptions of FIGS. 1 through 4B provided in the preceding may be applied to each unit shown in FIG. 5, and thus, repeated descriptions will be omitted for conciseness.

FIG. 6 illustrates an example of a soft demapping method. Referring to FIG. 6, the soft demapping method includes selecting a candidate in operation 630 and calculating an LLR in operation 650. In operation 630, at least two candidate constellation points are selected for each of a plurality of bits included in a symbol used for data transmission. For example, a single candidate constellation point is selected for each of a plurality of lines formed in a constellation for a single bit. In operation 650, an LLR for each of the plurality of bits is calculated based on a distance between each of candidate constellation points and a received signal.

In more detail, in operation 610, the soft demapping method includes pre-processing. In more detail, a received signal is obtained from a symbol representing the plurality of bits, transmitted from a transmitter.

For example, in operation 621, the soft demapping method includes performing rotation of a constellation of a corresponding single bit, in a reverse direction, for each of the plurality of bits. The constellation rotated reversely includes a plurality of constellation points forming a plurality of lines provided in a form of a vertically parallel shape or a horizontally parallel shape. In operation 630, a single candidate is selected for each of the plurality of lines provided in the form of a vertically parallel shape or a horizontally parallel shape.

In another example, in operation 622, the soft demapping method includes performing non-rotation of a constellation of a corresponding single bit, in a reverse direction, for each of the plurality of bits. The constellation for each of the plurality of bits includes a plurality of constellation points forming a plurality of lines provided in a form of a non-vertical parallel shape or a non-horizontal parallel shape. When the constellation is not rotated in a reverse direction, in operation 630, a single candidate is selected for each of the plurality of lines provided in the form of a non-vertical parallel shape or a non-horizontal parallel shape.

In operation 640, the soft demapping method includes calculating a Euclidean distance between a received signal and each of at least two candidates. For example, Euclidean distances between candidates selected for a plurality of horizontal lines and a received signal are calculated.

In operation 650, an LLR for each of a plurality of bits is calculated based on Equation 4. In more detail, an LLR with respect to a single bit $b_0$ is calculated based on a difference between a Euclidean distance of a candidate closest to the received signal among candidates of which a logic value of a single bit $b_0$ is "1" and a Euclidean distance of a candidate closest to the received signal among candidates of which a logic value of the single bit $b_0$ is "0". In a similar manner, an LLR with respect to a single bit $b_1$ is calculated based on a difference between a Euclidean distance of a candidate closest to the received signal among candidates of which a logic value of a single bit $b_1$ is "1" and a Euclidean distance of a candidate closest to the received signal among candidates of which a logic value of the single bit $b_1$ is "0".

In operation 660, the soft demapping method includes post-processing to detect bits. Descriptions of FIGS. 1 through 5 provided in the preceding may be applied to each operation described in FIG. 6, and thus, repeated descriptions will be omitted for conciseness.

Figure 7B:
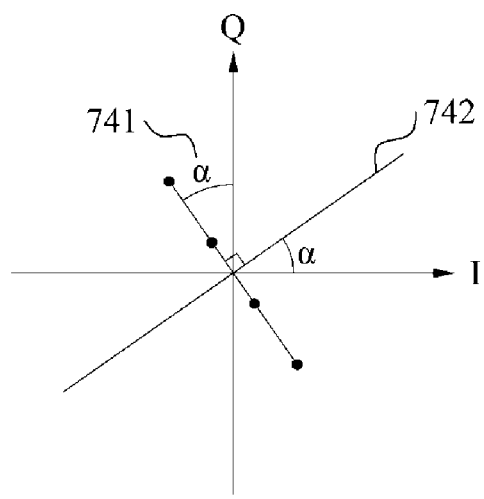

FIGS. 7A through 7D illustrate examples of a method of selecting a best candidate for a plurality of lines. Referring to FIG. 7A, both a channel state and a rotation angle of a constellation are applied to a constellation 710 of a received signal. The constellation 710 of the received signal corresponds to the faded rotated 16 QAM constellation 230 of FIG. 2. The constellation 710 of the received signal changes to an original non-rotated constellation 730. For example, the constellation 710 of the received signal changes to an original rotated constellation 720 by being scaled based on a state of an I channel and a state of a Q channel. The original rotated constellation 720 changes to the original non-rotated constellation 730 by being rotated based on a rotation angle of a constellation.

When the constellation 710 of the received signal changes to the original non-rotated constellation 730, a projection line 712 for projecting a received signal 711 to a plurality of lines changes correspondingly in the constellation 710 of the received signal. For example, the projection line 712 changes to a reference line 732 as the constellation 710 of the received signal changes to the original non-rotated constellation 730. The projection line 712 in the constellation 710 of the received signal lies at right angles to the plurality of lines. However, the reference line 732 in the original non-rotated constellation 730 is not disposed at right angles to the plurality of lines. Alternatively, a gradient of the reference line 732 is predetermined based on a received signal equalized by channel information.

Coordinate values of points to which a received signal 731 is projected based on the reference line 732, and relative positions amongst projection points, are maintained continuously in the original non-rotated constellation 730. Through pre-processing, expansion, contraction, or rotation of a constellation, for example, may be simplified based on such a characteristic.

A gradient ρ of the projection line 712 in the constellation 710 of the received signal is calculated to be $$\frac{h_I \sin\alpha}{h_Q \cos\alpha},$$

where "α" denotes an angle obtained through a constellation being rotated, "$h_I$" denotes a state of an I channel, and "$h_Q$" denotes a state of a Q channel. Referring to FIG. 7B, in an absence of an occurrence of channel degradation, when a rotation angle of a constellation is "α" 741, a gradient of a projection line 742 is tan(a). Accordingly, the gradient of the projection line 742 in an absence of an occurrence of channel degradation is represented by $$\frac{\sin\alpha}{\cos\alpha}.$$

Figure 7C:
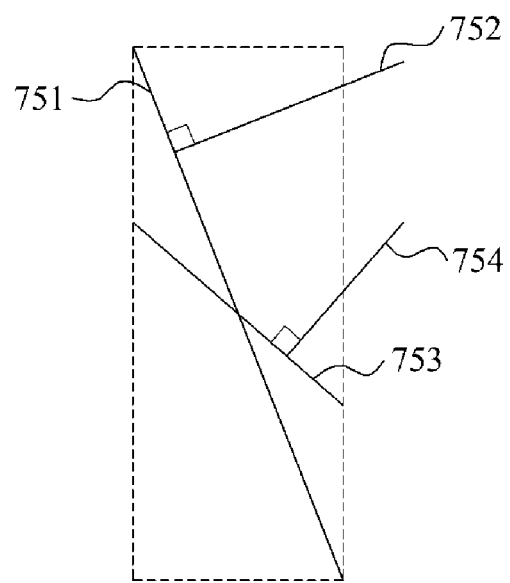

Referring to FIG. 7C, constellation points are distributed widely towards a direction of a Q coordinate axis when a state of a Q channel is relatively good, compared to an example in which the state of the Q channel is relatively bad. An absolute value of a gradient of a line 751 when the state of the Q channel is relatively good is greater than an absolute value of a gradient of a line 753 when the state of the Q channel is relatively bad. A gradient of a projection line 752 when the state of the Q channel is relatively good is less than a gradient of a projection line 754 when the state of the Q channel is relatively bad. Accordingly, a gradient of a projection line is inversely proportional to the state of the Q channel.

Figure 7D:
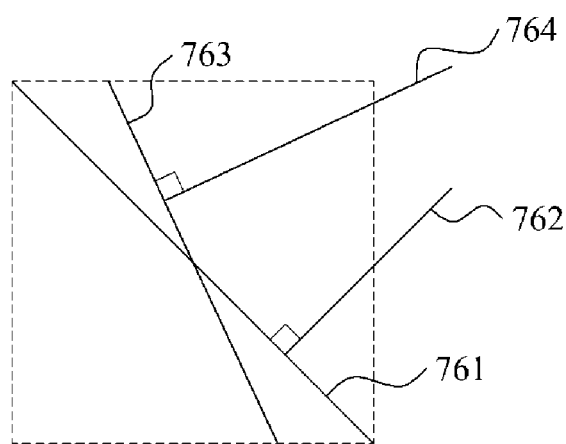

Referring to FIG. 7D, constellation points are distributed widely towards a direction of an I coordinate axis when a state of an I channel is relatively good, compared to an example in which the state of the I channel is relatively bad. An absolute value of a gradient of a line 761 when the state of the I channel is relatively good is less than an absolute value of a gradient of a line 763 when the state of the I channel is relatively bad. A gradient of a projection line 762 when the state of the I channel is relatively good is greater than a gradient of a projection line 764 when the state of the I channel is relatively bad. Accordingly, a gradient of a projection line is proportional to the state of the I channel. Therefore, referring again to FIG. 7A, the gradient ρ of the projection line 712 in the constellation 710 of the received signal is given by $$\frac{h_I \sin\alpha}{h_Q \cos\alpha}.$$

When the constellation 710 of the received signal changes to the original rotated constellation 720 through channel equalization, a gradient ρ of a reference line 722 is simplified to $$\frac{h_I^2 \sin\alpha}{h_Q^2 \cos\alpha}.$$

Channel equalization is performed by multiplying "$1/h_Q$" to the direction of the Q coordinate axis and multiplying "$1/h_I$" the direction of the I coordinate axis because the state of the Q channel and the state of the I channel have a value between "0" and "1". Channel equalization is performed by multiplying a channel equalization rate "$1/h_I$" in the I coordinate axis direction to a denominator corresponding to an increased value towards the x axis, and by multiplying a channel equalization rate "$1/h_Q$" in the Q coordinate axis to a numerator corresponding to an increased value towards the y axis direction, because a gradient is represented by (increased value towards a y axis/increased value towards an x axis) in general. Accordingly, the gradient ρ of the reference line 722 in the original rotated constellation 720 is calculated to be $$\frac{h_I^2 \sin\alpha}{h_Q^2 \cos\alpha}.$$

When the original rotated constellation 720 changes to the original non-rotated constellation 730 through rotation angle compensation, the gradient ρ of the reference line 732 is calculated to be $$\frac{(h_I^2 - h_Q^2)\sin\alpha\cos\alpha}{(h_Q\cos\alpha)^2 + (h_I\sin\alpha)^2}.$$

The gradient $$\frac{h_I^2 \sin\alpha}{h_Q^2 \cos\alpha}$$

of the reference line 722 is rotated in a reverse direction by a rotation angle "α" of a constellation through $$\frac{(h_I^2 - h_Q^2)\sin\alpha\cos\alpha}{(h_Q\cos\alpha)^2 + (h_I\sin\alpha)^2}.$$

A process of selecting an optimal candidate, using the reference line 732 changed in the original non-rotated constellation 730 that is an equalized constellation, is as follows. The plurality of lines in the original non-rotated constellation 730 is represented by Equation 5 because the plurality of lines includes straight lines.

$$x = a_I(-3, -1, 1, 3 \text{ for 16 QAM}) \quad \text{[Equation 5]}$$

In Equation 5, "$a_I$" denotes coordinates for determining a position of the plurality of lines. The reference line 732 crossing the received signal 731 is expressed by Equation 6.

$$y = \frac{\beta_{IC}\beta_{IS} - \beta_{QC}\beta_{QS}}{\beta_{QC}^2 + \beta_{IS}^2}x + \left(r_Q - \frac{\beta_{IC}\beta_{IS} - \beta_{QC}\beta_{QS}}{\beta_{QC}^2 + \beta_{IS}^2}r_I\right) \quad \text{[Equation 6]}$$

In Equation 6, $\beta_{IC} = h_I \cos\alpha$, $B_{IS} = h_I \sin\alpha$, $\beta_{QC} = h_Q \cos\alpha$, and $\beta_{QS} = h_Q \sin\alpha$. Intersecting points at which the plurality of lines intersects the reference line are defined by Equation 7.

$$c_I^2 = \alpha_I, \; c_Q^2 = r_Q - (r_I - \alpha_I)\frac{B_{IC}\beta_{IS} - \beta_{QC}\beta_{QS}}{\beta_{QC}^2 + \beta_{IS}^2} \quad \text{[Equation 7]}$$

Equation 7 is used for determining an optimal candidate for a plurality of lines for LLR calculation. Once a single intersecting point is calculated based on Equation 7, remaining intersecting points are easily calculated based on linearity because a plurality of constellation points is distributed at identical intervals in the original non-rotated constellation 730. For example, a y coordinate of an intersecting point 733 on a first line is calculated to be "−1.4" based on Equation 7. When the gradient of the reference line 732 is assumed to be "0.8", an intersecting point 734 on a second line is calculated to be "−1.4+2*0.8=0.2". An intersecting point 735 on a third line is calculated to be "0.2+1.6=1.8", and an intersecting point 736 on a fourth line is calculated to be "1.8+1.6=3.4". Through this, a soft demapper may be readily implemented.

FIG. 8A illustrates an example of a method of calculating a gradient of a reference line in a constellation for even-numbered bits, for example, $b_1$ and $b_3$, among a plurality of bits included in a symbol. Hereinafter, an index, for example, "1" or "3", of even-numbered bits, for example, $b_1$ and $b_3$, among a plurality of bits corresponds to an odd number, and an index, for example, "0" or "2", of odd-numbered bits, for example, $b_0$ and $b_2$, among the plurality of bits corresponds to an even number.

Referring to FIG. 8A, both a channel state and a rotation angle of a constellation are applied to a constellation 810 of a received signal. The constellation 810 of the received signal corresponds to the faded rotated 16 QAM constellation 230 of FIG. 2. The constellation 810 of the received signal changes to an original non-rotated constellation 830. In more detail, the constellation 810 of the received signal changes to an original rotated constellation 820 by being scaled based on a state of an I channel and a state of a Q channel. The original rotated constellation 820 changes to the original non-rotated constellation 830 by being rotated based on a rotation angle of a constellation.

Figure 8B:
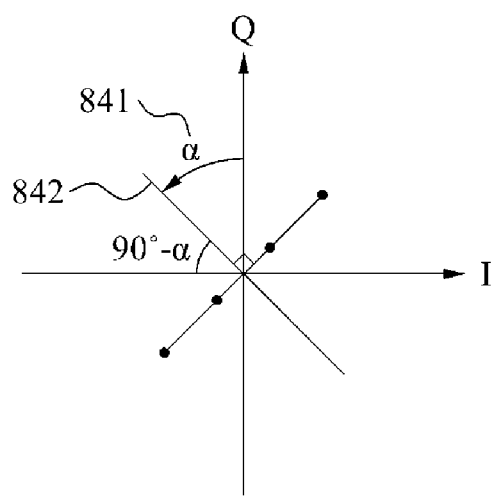

A gradient ρ of a projection line in the constellation 810 of the received signal is calculated to be $$-\frac{h_I \sin\left(\frac{\pi}{2} - \alpha\right)}{h_Q \cos\left(\frac{\pi}{2} - \alpha\right)}$$

because, referring to FIG. 8B, in an absence of an occurrence of channel degradation, when a rotation angle of a constellation is "α" 841, a gradient of a projection line 842 is "–tan (π/2–α)", where "α" denotes an angle obtained through a constellation being rotated, "$h_I$" denotes a state of an I channel, and "$h_Q$" denotes a state of a Q channel. The gradient $$-\frac{h_I \sin\left(\frac{\pi}{2} - \alpha\right)}{h_Q \cos\left(\frac{\pi}{2} - \alpha\right)}$$

of the projection line is simplified to $$-\frac{h_I \cos\alpha}{h_Q \sin\alpha}.$$

When the constellation 810 changes to the original rotated constellation 820 through channel equalization, a gradient ρ of a reference line is calculated to be $$-\frac{h_I^2 \cos\alpha}{h_Q^2 \sin\alpha}.$$

When the original rotated constellation 820 changes to the original non-rotated constellation 830 through rotation angle compensation, the gradient ρ of the reference line is calculated to be $$\frac{(h_Q \sin\alpha)^2 + (h_I \cos\alpha)^2}{(h_I^2 - h_Q^2)\sin\alpha\cos\alpha}.$$

Descriptions of FIG. 7A provided in the preceding may be applied to a method of inducing a gradient of a reference line and a method of selecting best candidates for a plurality of lines using a gradient of a reference line, and thus, repeated descriptions will be omitted for conciseness.

Figure 9:
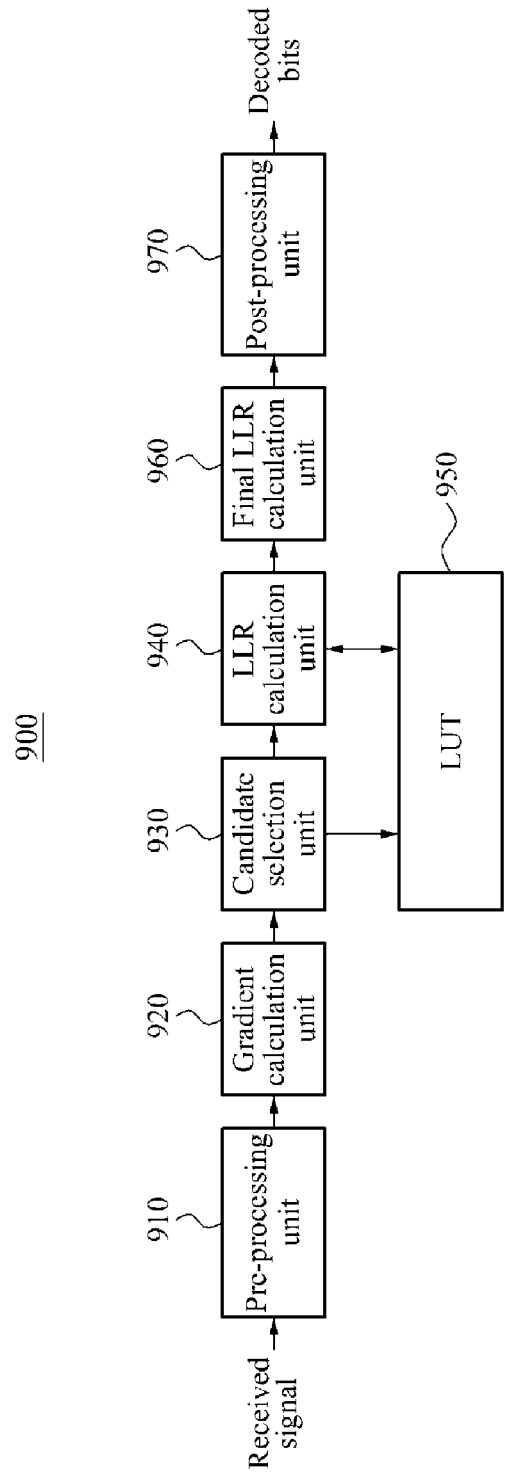
FIG. 9 is a block diagram illustrating another example of a soft demapping apparatus.

FIG. 9 illustrates another example of a soft demapping apparatus 900. Referring to FIG. 9, the soft demapping apparatus 900 includes a pre-processing unit 910, a gradient calculation unit 920, a candidate selection unit 930, an LLR calculation unit 940, a LUT 950, a final LLR calculation unit 960, and a post-processing unit 970.

The pre-processing unit 910 obtains a received signal from a symbol representing a plurality of bits, transmitted from a transmitter. The symbol may refer to an M-QAM symbol, where "M"=$2^n$ and "n" is an integer greater than two.

The gradient calculation unit 920 calculates a gradient of a reference line in a constellation for a single bit based on a rotation angle of a constellation and a channel state. For example, the gradient calculation unit 920 may calculate a gradient of a projection line disposed at right angles to a plurality of lines corresponding to a logic value of a single bit in a constellation to which a rotation angle and a channel state are applied. Also, the gradient calculation unit 920 may scale the gradient of the projection line based on the channel state, and rotate the straight-lined gradient scaled based on the rotation angle. Alternatively, the gradient calculation unit 920 may calculate a gradient of a reference line to be $$\frac{(h_I^2 - h_Q^2)\sin\alpha\cos\alpha}{(h_Q\cos\alpha)^2 + (h_I\sin\alpha)^2}$$

when a single bit belongs to a first group among a plurality of bits. When a single bit belongs to a second group among the plurality of bits, the gradient calculation unit 920 may calculate the gradient of the reference line to be $$\frac{(h_Q\sin\alpha)^2 + (h_I\cos\alpha)^2}{(h_I^2 - h_Q^2)\sin\alpha\cos\alpha},$$

where "$h_I$" denotes a channel state of an I channel, "$h_Q$" denotes a channel state of a Q channel, and "α" denotes a rotation angle of a constellation.

The candidate selection unit 930 selects a single candidate for a plurality of lines corresponding to a logic value of a single bit from a plurality of constellation points included in a constellation for the single bit, based on a received signal and a gradient of a reference line. For example, the candidate selection unit 930 includes a coordinates calculation unit that calculates coordinates of intersecting points between a straight line crossing the received signal and a plurality of lines based on the gradient of the reference line, and a constellation point selection unit that selects a constellation point closest to an intersecting point of a corresponding line from the plurality of constellation points included in the corresponding line for the plurality of lines.

The LLR calculation unit 940 calculates an LLR with respect to a single bit based on a received signal and selected candidates. For example, the LLR calculation unit 940 calculates Euclidean distances between the received signal and the selected candidates, and based on the Euclidean distances, calculates the LLR with respect to the single bit. When an index of a single bit is an even number among a plurality of bits, the LLR calculation unit 940 calculates an LLR with respect to an alternative bit of which an index is an even number among a plurality of bits, based on the received signal and the selected candidates. When an index of a single bit is an odd number in a plurality of bits, the LLR calculation unit 940 calculates an LLR with respect to an alternative bit of which an index is an odd number among a plurality of bits, based on the received signal and the selected candidates.

The LUT 950 stores the Euclidean distances between the received signal and the selected candidates and indices of the selected candidates. The LLR calculation unit 940 calculates an LLR with respect to an alternative bit based on Euclidean distances and indices with respect to a predetermined bit stored in the LUT.

The final LLR calculation unit 960 combines LLRs for a plurality of bits in order to detect the plurality of bits. LLRs with respect to $\{b_0, b_2, \ldots b_{n-2}\}$ and $\{b_1, b_3, \ldots b_{n-1}\}$ are combined.

The post-processing unit 970 outputs decoded bits based on the combined LLRs. Descriptions of FIGS. 1 through 8 provided in the preceding may be applied to each module shown in FIG. 9, and thus, repeated descriptions will be omitted for conciseness.

Figure 10:
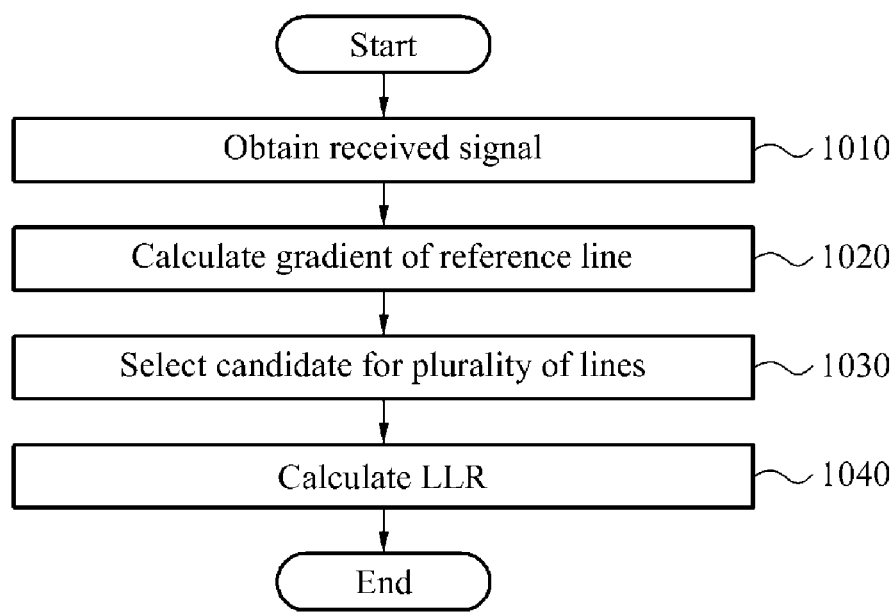
FIG. 10 is a flowchart illustrating another example of a soft demapping method.

FIG. 10 illustrates another example of a soft demapping method. Referring to FIG. 10, in operation 1010, the soft demapping method includes obtaining a received signal from a symbol transmitted from a transmitter.

In operation 1020, the soft demapping method includes calculating a gradient of a reference line in a constellation for a single bit based on a rotation angle and a channel state of the constellation. In operation 1030, the soft demapping method includes selecting a single candidate for each of a plurality of lines corresponding to a logic value of a single bit from a plurality of constellation points included in a constellation for the single bit based on a received signal and a gradient of a reference line.

In operation 1040, the soft demapping method includes calculating an LLR with respect to a single bit based on a received signal and selected candidates. Descriptions of FIGS. 1 through 9 provided in the preceding may be applied to each operation described in FIG. 10, and thus, repeated descriptions will be omitted for conciseness.

The various units, modules, elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a device described herein may refer to mobile devices such as, for example, a cellular phone, a smart phone, a wearable smart device (such as, for example, a ring, a watch, a pair of glasses, a bracelet, an ankle bracket, a belt, a necklace, an earring, a headband, a helmet, a device embedded in the cloths or the like), a personal computer (PC), a tablet personal computer (tablet), a phablet, a personal digital assistant (PDA), a digital camera, a portable game console, an MP3 player, a portable/personal multimedia player (PMP), a handheld e-book, an ultra mobile personal computer (UMPC), a portable lab-top PC, a global positioning system (GPS) navigation, and devices such as a high definition television (HDTV), an optical disc player, a DVD player, a Blue-ray player, a setup box, or any other device capable of wireless communication or network communication consistent with that disclosed herein. In a non-exhaustive example, the wearable device may be self-mountable on the body of the user, such as, for example, the glasses or the bracelet. In another non-exhaustive example, the wearable device may be mounted on the body of the user through an attaching device, such as, for example, attaching a smart phone or a tablet to the arm of a user using an armband, or hanging the wearable device around the neck of a user using a lanyard.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of performing a soft demapping, the method comprising: obtaining a signal from a symbol representing bits that is transmitted from a transmitter; calculating a gradient of a reference line in a constellation for a bit based on a rotation angle and a channel state of the constellation; selecting a candidate for each of lines that corresponds to a logic value of the bit from constellation points comprised in the constellation based on the signal and the gradient of the reference line; and calculating a log-likelihood ratio (LLR) of the bit based on the signal and the selected candidate for each of the lines, wherein the selecting of the candidate for each of the lines comprises: calculating coordinates of intersecting points between the reference line and the lines, the reference line crossing the signal; and selecting constellation points based on the coordinates of the intersecting points.

2. The method of claim 1, wherein the calculating of the gradient of the reference line comprises:
calculating a gradient of a straight line located at right angles to the lines in the constellation to which the rotation angle and the channel state are applied;
scaling the gradient of the straight line based on the channel state; and
rotating the scaled gradient of the straight line based on the rotation angle.

3. The method of claim 1, wherein the calculating of the coordinates comprises: projecting the signal to the lines based on the gradient of the reference line, and wherein the selecting of constellation points comprises selecting a constellation point closest to a point at which the signal is projected to a corresponding line from constellation points comprised in the corresponding line, for each of the lines.

4. The method of claim 1, wherein the calculating of the LLR comprises:
calculating Euclidean distances between the signal and the selected candidate for each of the lines; and
calculating the LLR based on the Euclidean distances.

5. The method of claim 4, further comprising:
storing, in a lookup table (LUT), the Euclidean distances and indices of the selected candidate for each of the lines; and
calculating an LLR of another bit based on the stored Euclidean distances and the stored indices.

6. The method of claim 1, further comprising:
calculating an LLR of another bit of which an index is an even number among the bits based on the signal and the selected candidate for each of the lines in response to an index of the bit among the bits being an even number; and
calculating an LLR of still another bit of which an index is an odd number among the bits based on the signal and the selected candidate for each of the lines in response to the index of the bit among the bits being an odd number.

7. The method of claim 1, further comprising:
detecting the bits based on the LLR of the bit.

8. The method of claim 1, wherein:
the symbol is an M-quadrature amplitude modulation (QAM) symbol, M being $2^n$, and n being an integer greater than two; and
each of the lines comprises a $\sqrt{M}$ number of constellation points.

9. A non-transitory computer-readable storage medium storing a program comprising instructions to cause a computer to perform the method of claim 1.

10. The method of claim 1, wherein the gradient calculation unit is configured to:
calculate the gradient of the reference line to be $$\frac{(h_I^2 - h_Q^2)\sin\alpha\cos\alpha}{(h_Q\cos\alpha)^2 + (h_I\sin\alpha)^2},$$

$h_I$ being a state of a first channel comprised in the channel state, $h_Q$ being a state of a second channel comprised in the channel state, and α being the rotation angle, in response to the bit belonging to a first group among the bits; and calculate the gradient of the reference line to be $$\frac{(h_Q \sin\alpha)^2 + (h_I \cos\alpha)^2}{(h_I^2 - h_Q^2)\sin\alpha\cos\alpha},$$

in response to the bit belonging to a second group among the bits.

11. An apparatus configured to perform a soft demapping, the apparatus comprising: a pre-processing unit configured to pre-process a signal obtained from a symbol representing bits that is transmitted from a transmitter; a gradient calculation unit configured to calculate a gradient of a reference line in a constellation for a bit based on a rotation angle and a channel state of the constellation; a candidate selection unit configured to select a candidate for each of lines that corresponds to a logic value of the bit from constellation points comprised in the constellation based on the signal and the gradient of the reference line; and a log-likelihood ratio (LLR) calculation unit configured to calculate an LLR of the bit based on the signal and the selected candidate for each of the lines, wherein the candidate selection unit is further configured to calculate coordinates of intersecting points between the reference line and the lines, the reference line crossing the signal, and select constellation points based on the coordinates of the intersecting points.

12. The apparatus of claim 11, wherein the gradient calculation unit is configured to:

calculate the gradient of the reference line to be $$\frac{(h_I^2 - h_Q^2)\sin\alpha\cos\alpha}{(h_Q \cos\alpha)^2 + (h_I \sin\alpha)^2},$$

$h_I$ being a state of a first channel comprised in the channel state, $h_Q$ being a state of a second channel comprised in the channel state, and α being the rotation angle, in response to the bit belonging to a first group among the bits; and calculate the gradient of the reference line to be $$\frac{(h_Q \sin\alpha)^2 + (h_I \cos\alpha)^2}{(h_I^2 - h_Q^2)\sin\alpha\cos\alpha},$$

in response to the bit belonging to a second group among the bits.

13. The apparatus of claim 11, wherein the candidate selection unit is further configured to: select a constellation point closest to an intersecting point between the reference line and a corresponding line from constellation points comprised in the corresponding line, for each of the lines.

14. The apparatus of claim 11, further comprising:
a final LLR calculation unit configured to calculate a final LLR to be used to detect the bits, based on the LLR of the bit.

15. The apparatus of claim 11, wherein:
the symbol is an M-quadrature amplitude modulation (QAM) symbol, M being $2^n$, and n being an integer greater than two; and
each of the lines comprises a $\sqrt{M}$ number of constellation points.

16. The apparatus of claim 11, further comprising:
a lookup table (LUT) configured to store Euclidean distances between the signal and the selected candidate for each of the lines and indices of the selected candidate for each of the lines,
wherein the LLR calculation unit is configured to calculate an LLR of another bit based on the stored Euclidean distances and the stored indices.

17. The apparatus of claim 11, wherein the candidate selection unit is further configured to: project the signal to the lines based on the gradient of the reference line to calculate the coordinates of the intersecting points; and select a constellation point closest to a point at which the signal is projected to a corresponding line from constellation points comprised in the corresponding line, for each of the lines.

* * * * *